(12) United States Patent  (10) Patent No.: US 9,143,413 B1
Manku et al.  (45) Date of Patent: Sep. 22, 2015

(54) PRESENTING WIRELESS-SPECTRUM USAGE INFORMATION

(71) Applicant: Cognitive Systems Corp., Waterloo (CA)

(72) Inventors: Tajinder Manku, Waterloo (CA); Oleksiy Kravets, Petersburg (CA); Hugh Robert Faulkner Hind, Waterloo (CA)

(73) Assignee: Cognitive Systems Corp., Waterloo, ON (CA)

( * ) Notice: Subject to any disclaimer, the term of this patent is extended or adjusted under 35 U.S.C. 154(b) by 0 days.

(21) Appl. No.: 14/521,173

(22) Filed: Oct. 22, 2014

(51) Int. Cl.
*H04M 11/00* (2006.01)
*H04L 12/26* (2006.01)
*H04W 4/26* (2009.01)
*H04W 24/10* (2009.01)

(52) U.S. Cl.
CPC ........... *H04L 43/045* (2013.01); *H04L 43/065* (2013.01); *H04W 4/26* (2013.01); *H04W 24/10* (2013.01)

(58) Field of Classification Search
USPC ........ 455/405, 404.2, 456.1, 41.2, 3.06, 41.1, 455/420, 552.1, 67.7, 454, 422.1, 418, 501, 455/90.2, 74.1, 434, 62, 14; 370/248, 328, 370/352, 252
See application file for complete search history.

(56) References Cited

U.S. PATENT DOCUMENTS

| | | | |
|---|---|---|---|
| 6,046,682 A | * | 4/2000 | Zimmerman et al. ......... 340/8.1 |
| 6,816,709 B2 | | 11/2004 | Dickey |
| 6,917,609 B2 | | 7/2005 | Dickey |
| 6,931,235 B2 | | 8/2005 | Kline et al. |
| 6,950,665 B2 | | 9/2005 | Swift et al. |
| 7,013,113 B2 | | 3/2006 | Dickey |
| 7,019,691 B1 | | 3/2006 | Soltanian et al. |
| 7,050,755 B2 | | 5/2006 | Kline |
| 7,180,420 B2 | | 2/2007 | Maurer |
| 7,236,746 B2 | | 6/2007 | Peric |
| 7,272,126 B2 | | 9/2007 | Soltanian et al. |
| 7,295,156 B2 | | 11/2007 | Van Wyck Loomis |

(Continued)

FOREIGN PATENT DOCUMENTS

| CA | 2192248 | 6/1997 |
|---|---|---|
| EP | 0863638 | 9/1998 |
| WO | 2010/083606 | 7/2010 |

OTHER PUBLICATIONS

SeeGull® EXflex™ Scanning Receiver, PCTEL® RF Solutions, Obtained online at http://rfsolutions.pctel.com/artifacts/10MRK2_11_SeeGull_EXflex_Brochure.pdf on Jul. 17, 2014, 4 pages.

(Continued)

*Primary Examiner* — Joseph Arevalo
(74) *Attorney, Agent, or Firm* — Michael K. Henry; Henry Patent Law Firm PLLC

(57) ABSTRACT

In some aspects, a method of displaying wireless-spectrum usage information is described. In some examples, a surface plot of a measure of wireless-spectrum usage for a geographic region is generated. The surface plot is based on analysis of physical layer signals detected at wireless-spectrum monitoring locations distributed over the geographic region. The surface plot is superimposed onto a view of the geographic region by operation of a display device. The superimposed surface plot visually indicates values for the measure of wireless-spectrum usage over the view of the geographic region.

20 Claims, 15 Drawing Sheets

(56) References Cited

U.S. PATENT DOCUMENTS

| | | | |
|---|---|---|---|
| 7,460,837 | B2 | 12/2008 | Diener |
| 7,466,986 | B2* | 12/2008 | Halcrow et al. ............ 455/456.2 |
| 7,610,036 | B2 | 10/2009 | Teo et al. |
| 7,639,985 | B2 | 12/2009 | Dickey |
| 8,422,461 | B2 | 4/2013 | Dickey |
| 8,576,825 | B2 | 11/2013 | Wu et al. |
| 8,760,765 | B2 | 6/2014 | Gupta |
| 2003/0139909 | A1* | 7/2003 | Ozawa .......................... 702/183 |
| 2004/0152471 | A1* | 8/2004 | MacDonald et al. ...... 455/456.1 |
| 2005/0108129 | A1 | 5/2005 | Seibert et al. |
| 2005/0286409 | A1 | 12/2005 | Yoon et al. |
| 2006/0083205 | A1 | 4/2006 | Buddhikot et al. |
| 2006/0246911 | A1* | 11/2006 | Petermann .................... 455/444 |
| 2008/0076450 | A1 | 3/2008 | Nanda et al. |
| 2008/0125108 | A1 | 5/2008 | Kuo et al. |
| 2008/0166974 | A1 | 7/2008 | Teo et al. |
| 2008/0231499 | A1 | 9/2008 | Kim et al. |
| 2008/0266050 | A1 | 10/2008 | Crouse et al. |
| 2009/0197550 | A1* | 8/2009 | Huttunen et al. .......... 455/161.1 |
| 2009/0201208 | A1 | 8/2009 | McPherson et al. |
| 2010/0135263 | A1 | 6/2010 | Zakrzewski |
| 2010/0203837 | A1* | 8/2010 | Taniguchi .................... 455/41.2 |
| 2010/0246416 | A1 | 9/2010 | Sinha et al. |
| 2011/0085524 | A1 | 4/2011 | Soliman et al. |
| 2011/0166897 | A1* | 7/2011 | Beckman .......................... 705/5 |
| 2011/0185059 | A1 | 7/2011 | Adnani et al. |
| 2011/0210843 | A1 | 9/2011 | Kummetz |
| 2011/0285589 | A1 | 11/2011 | Bull |
| 2012/0238218 | A1 | 9/2012 | Stine |
| 2013/0029589 | A1* | 1/2013 | Bontu et al. ...................... 455/7 |
| 2013/0072226 | A1 | 3/2013 | Thramann |
| 2013/0150074 | A1* | 6/2013 | Shrestha et al. ........... 455/456.1 |
| 2013/0248691 | A1 | 9/2013 | Mirov et al. |
| 2013/0310093 | A1 | 11/2013 | Giannakis et al. |
| 2014/0063055 | A1* | 3/2014 | Osterhout et al. ............. 345/633 |
| 2014/0162702 | A1 | 6/2014 | Crawford et al. |
| 2014/0168225 | A1* | 6/2014 | Ohwaki et al. ................ 345/501 |
| 2014/0274109 | A1* | 9/2014 | Venkatraman et al. .... 455/456.1 |
| 2015/0119014 | A1 | 4/2015 | Muraoka et al. |

OTHER PUBLICATIONS

EXflex™ Pay Per Use Metered Licensing System, Feature Highlight, Obtained online at http://rfsolutions.pctel.com/artifacts/Pctel_PPU_FINAL.Pdf on Jul. 17, 2014, 1 page.

PCTEL, SeeGull® Scann Receivers, High Performance Wireless Network Measurement, Obtained online at http://rfsolutions.pctel.com/content.cgi?id_num=683 on Jul. 17, 2014, 8 pages.

Baldock radio monitoring station, obtained online at http://stakeholders.ofcom.org.uk/binaries/enforcement/spectrum-enforcement/baldock.pdf, on Jul. 17, 2014, 13 pages.

Physical Layer from Wikipedia, obtained online at http://en.wikipedia.org/wiki/Physical_layer on Aug. 22, 2014, 3 pages.

PCTEL, SeeHawk® Wireless Drive and Walk Test Suite, obtained online at http://rfsolutions.pctel.com/content.cgi?id_num=1013 on Aug. 20, 2014, 9 pages.

AZQ Android—WCDMA/GSM Drive Test Tool on Android, obtained online at http://www.azenqos.com/ on Aug. 6, 2014, 13 pages.

OSI model from Wikipedia, version dated Oct. 21, 2014, obtained online at http://en.wikipedia.org/w/index.php?title=OSI_model&oldid=630564496, 8 pages.

Office Action in U.S. Appl. No. 14/334,822 issued on Oct. 24, 2014, 18 pages.

Buddhikot et al. DIMSUMNet: New Directions in Wireless Networking Using Coordinated Dynamic Spectrum Access, Poroceedings of the Sixth IEEE International Symposium on (WoWMoM '05), 2005 IEEE; 8 pages.

International Search Report and Written Opinion issued in application PCT/CA2014/000602 on Mar. 20, 2015, 10 pages.

Office action in U.S. Appl. No. 14/613,912 issued on May 19, 2015, 18 pages.

Non-Final Office Action received in U.S. Appl. No. 14/668,549, Jun. 10, 2015, 11 pages.

Non-Final Office Action received in U.S. Appl. No. 14/730,688, Jul. 17, 2015, 20 pages.

PCT International Search Report and Written Opinion of the International Searching Authority, PCT/CA2014/000826, Jul. 16, 2015, 8 pages.

* cited by examiner

PRESENTING WIRELESS-SPECTRUM USAGE INFORMATION

BACKGROUND

This specification relates to presenting wireless-spectrum usage information.

Radio frequency (RF) spectrum is a limited and valuable resource. Governmental agencies and regulatory authorities typically control allocation and use of the spectrum, and the rights to use portions of the spectrum are sold or licensed to wireless service providers and other types of public and private entities. The wireless service providers use the spectrum allocated to them to provide wireless services to end users, for example, in the frequency bands for wireless communication standards.

SUMMARY

In a general aspect, wireless-spectrum usage is monitored, and wireless-spectrum usage information for a geographic region is displayed.

In some aspects, a surface plot of a measure of wireless-spectrum usage for a geographic region is generated. The surface plot is based on analysis of physical layer signals detected at wireless-spectrum monitoring locations distributed over the geographic region. The surface plot is superimposed onto a view of the geographic region by operation of a display device. The superimposed surface plot visually indicates values for the measure of wireless-spectrum usage over the view of the geographic region.

In some aspects, a device includes data processing apparatus and a display device. The data processing apparatus is configured to generate a surface plot of a measure of wireless-spectrum usage for a geographic region. The surface plot is based on analysis of physical layer signals detected at wireless-spectrum monitoring locations distributed over the geographic region. The display device is configured to overlay the surface plot onto a view of the geographic region. The superimposed surface plot visually indicates values for the measure of wireless-spectrum usage over the view of the geographic region.

In some aspects, a wireless-spectrum analysis system includes a communication system, data processing apparatus, and a display device. The communication system is configured to receive spectral-usage data from wireless-spectrum analysis devices at wireless-spectrum monitoring locations distributed over a geographic region. The spectral-usage data is based on analysis of physical layer signals detected at the wireless-spectrum monitoring locations. The data processing apparatus is configured to generate a surface plot of a measure of wireless-spectrum usage based on the spectral-usage data. The display device is configured to superimpose the surface plot onto a view of the geographic region. The superimposed surface plot visually indicates values for the measure of wireless-spectrum usage over the view of the geographic region.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
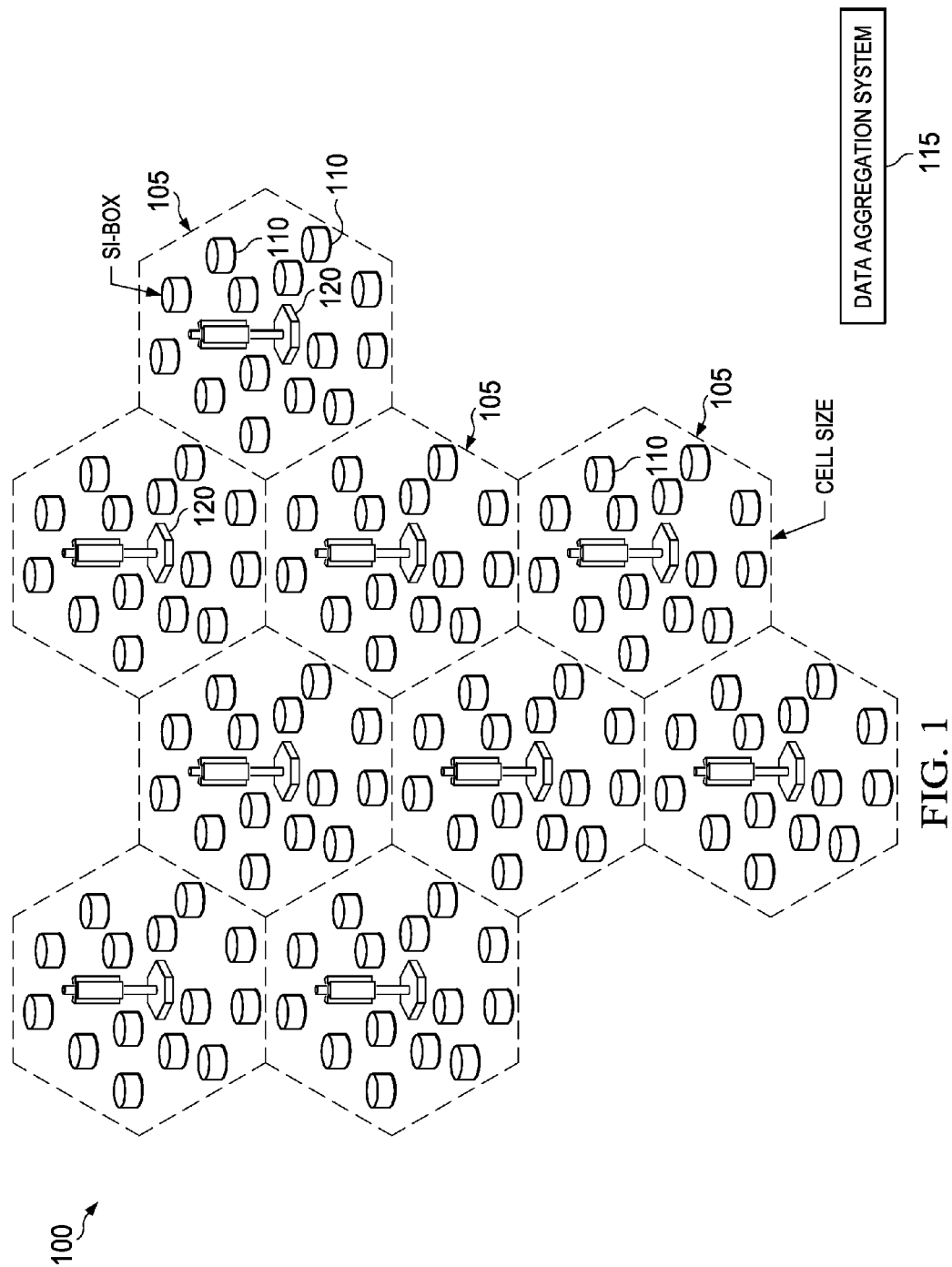
FIG. 1 is a block diagram showing an example wireless-spectrum analysis system.

In some aspects of what is described here, wireless-spectrum usage is monitored and analyzed over space and time. For example, spectral-usage parameters can be aggregated from a number of wireless-spectrum analysis devices that operate concurrently at various locations in a geographic region. The geographic region can be relatively small or large (e.g., having a radius ranging from tens or hundreds of meters to multiple kilometers) and can generally represent any area of interest (e.g., a building, city block, jurisdiction, demographic, industry, etc.). In some instances, the aggregated data can facilitate a realistic and comprehensive analysis of spectral usage and provide an understanding of the utilization and quality of wireless-spectrum and other resources in the geographic region.

In some implementations, wireless-spectrum usage for various wireless communication standards is monitored and analyzed. For example, the wireless-spectrum analysis devices can monitor and analyze 2G standards such as Global System for Mobile (GSM) and Enhanced Data rates for GSM Evolution (EDGE) or EGPRS, 3G standards such as Code division multiple access (CDMA), Universal Mobile Telecommunications System (UMTS), and Time Division Synchronous Code Division Multiple Access (TD-SCDMA), 4G standards such as Long-Term Evolution (LTE) and LTE-Advanced (LTE-A), wireless local area network (WLAN) or WiFi standards such as IEEE 802.11, Bluetooth, near-field communications (NFC), millimeter communications, or multiple of these or other types of wireless communication standards. In some implementations, wireless-spectrum usage for other types of wireless communication (e.g., non-standardized signals and communication protocols) is monitored and analyzed.

In some instances, wireless-spectrum usage data and related information can be collected by or provided to (e.g., sold, subscribed, shared, or otherwise provided to) various entities. For example, wireless-spectrum usage data can be used by governmental agencies or regulatory authorities (e.g., Federal Communications Commission (FCC), etc.), standards-development organizations (e.g., 3rd Generation Partnership Project (3GPP), the Institute of Electrical and Electronics Engineers (IEEE), etc.), spectrum rights owners and licensees, wireless service providers, wireless device and chip manufactures and vendors, end users of the wireless services, or other entities.

The wireless-spectrum usage data and related information can be used for a variety of purposes. For example, governmental agencies or regulatory authorities may use the information to better regulate, control, and enforce allocated or unallocated spectrum usage rights, standards-development organizations may use the information to choose operating frequencies and develop standards to balance spectrum load (e.g., by exploiting under-loaded frequency bands and offloading congested frequency bands), or service providers may use the information to optimize or otherwise improve system hardware, software, services, or infrastructure.

With more accurate and more comprehensive spectrum usage data, targeted schemes can be designed to improve the utilization of wireless-spectrum and other resources. In some instances, based on utilization and quality of the frequency bands that they own or operate on, spectrum rights owners and licensees or wireless service providers can design, modify, or otherwise manage their own spectrum usage. For example, given the knowledge that certain geographic locations experience heavy data traffic, wireless service providers may add base stations or modify a cell configuration (e.g., adjusting a frequency reuse scheme) to accommodate the heavy data traffic in the geographic locations. As another example, given the knowledge that certain times of day experience heavier data traffic than others, wireless service providers may design promotions or policies to encourage usage during other than peak hours.

In some examples, a wireless-spectrum analysis system includes a number of wireless-spectrum analysis devices (e.g., spectrum inspection (SI) boxes) and a data aggregation system. The wireless-spectrum analysis devices can be distributed over various locations over a geographic region. The wireless-spectrum analysis devices can monitor and analyze the RF spectrum at the respective locations, and transmit spectral-usage parameters to the data aggregation system. The data aggregation system can serve as a central back-end system that aggregates, compiles, and analyzes information transmitted from the wireless-spectrum analysis devices.

In some implementations, the wireless-spectrum analysis system and the individual wireless-spectrum analysis devices can perform various types of analysis in the frequency domain, the time domain, or both. For example, analyzing wireless-spectrum usage may include analyzing the wireless spectrum in a frequency domain, analyzing wireless signals in the time domain, or a combination of these and other types of analysis. In some cases, the wireless-spectrum analysis devices are configured to determine bandwidth, power spectral density, or other frequency attributes based on detected signals. In some cases, the wireless-spectrum analysis devices are configured to perform demodulation and other operations to extract content from the wireless signals in the time domain such as, for example, signaling information included the wireless signals (e.g., preambles, synchronization information, channel condition indicator, or SSID/MAC address of a WiFi network).

In some examples, a wireless-spectrum analysis system provides a spectral-usage report based on spectral-usage data from the devices. In some examples, the spectral-usage report can include frequency-domain information, time-domain information, spatial-domain information, or a combination of these and other knowledge gained from analyzing the wireless signals detected by the wireless-spectrum analysis devices. The spectral-usage report can include global information and higher-level knowledge based on the data from all multiple wireless-spectrum analysis devices in disparate locations. For instance, the spectral-usage report can include trends, statistics, patterns, coverage, network performance, or other information over time or space. In some implementations, the spectral-usage report can be tailored or customized based on the business, preferences, or other attributes of a particular user or entity. In some instances, a spectral-usage report can include text, data, tables, charts, graphs, or other representations of wireless-spectrum usage.

In some examples, the spectral-usage report can be provided to users (e.g., in a user-interface), stored in a database (e.g., for analysis or archival purposes), transmitted to subscribers or other entities (e.g., governmental agencies or regulatory authorities, standards-development organizations, spectrum rights owners and licensees, wireless service providers, etc.), or output in another manner. For instance, the spectral-usage data can be presented to a user through a display device. The display device can be an integral component of or otherwise coupled to a head-mounted device (e.g., a Google Glass), a hand-held device (e.g., a smart phone, tablet, phablet, and laptop), or other devices (e.g., desktop, television set, etc.). The display device can render, for example, a surface plot of a measure or metric of wireless-spectrum usage for a geographic region.

In some cases, the surface plot can be superimposed onto a view of the geographic region. The surface plot can include, for example, a contour-style plot or a temperature-style plot (e.g., a heat map) that visually indicates different values of the measure of wireless-spectrum usage at different locations over the geographic region. The surface plot can be superimposed, for example, by rendering the surface plot as an additional layer in a map or image of the geographic region. The added layer can be a mesh, a translucent form, or another type of graphic element that is visible in the view of the geographic region. The added layer can be aligned (e.g., based on reference points) with the map, image, or naked-eye view, so that the size and orientation of the surface plot matches the size and orientation of the view of the geographic region. The visual alignment between the surface plot and the view of the geographic region can provide a visual indication of wireless-spectrum usage values for the geographic region.

In some examples, a large number of wireless-spectrum analysis devices can be used at distinct locations over a geographic region to concurrently monitor wireless-spectrum usage at each distinct location. Accordingly, RF signals at various locations can be inspected at the same time or during overlapping time periods, which may render a more accurate and more comprehensive inspection of the spectrum usage over the geographic region. In some cases, a wireless-spectrum analysis device monitors wireless-spectrum usage at its respective location by "listening" or "watching" for RF signals over a broad range of frequencies and processing the RF signals that it detects. There may be times when no RF signals are detected, and a wireless-spectrum analysis device may process RF signals (e.g., from time to time or continuously) as they are detected in the local environment of the device.

In many instances, the wireless-spectrum analysis devices can detect wireless signals that have been transmitted by or between other entities or systems, for example, on a particular frequency or set of frequencies, or by natural phenomena. The source, destination, context, and nature of the wireless signals can vary. Accordingly, the wireless-spectrum analysis devices may monitor wireless-spectrum usage by a variety of systems, entities, or phenomena, and the systems described here are not limited to monitoring any particular type or class of systems or protocols.

In some cases, the wireless-spectrum analysis devices can be implemented as relatively low-cost, compact, and lightweight devices. The small size and portability can, in some instances, expand the applicability and enhance the flexibility of the wireless-spectrum analysis system. In some instances, wireless-spectrum analysis devices can be placed at or coupled to a pico/femto cell box of a cellular system, a WiFi access point or base station, a vehicle, a router, a mobile device (e.g., a smartphone, a tablet, etc.), a computer, an Internet of Things (e.g., machine to machine (M2M)) module, a cable modem box, a home gear electronic box (e.g., TV, modem, DVD, video game stations, laptops, kitchen gear, printers, lighting, phones, clocks, thermostats, fire detection units, $CO_2$ detection units, etc.), or other places.

In some implementations, a wireless-spectrum analysis device can perform computations and analyses on the raw data (e.g., the detected RF signals) on the spot, to extract a digest of relevant information (e.g., spectral-usage parameters). In some implementations, instead of transmitting the raw data to the data aggregation system, the wireless-spectrum analysis devices transmit the digest extracted from the raw data, which may reduce data traffic, reduce power consumption (which may extend battery life, where applicable), and provide other advantages. In some cases, the raw data can be transmitted to the data aggregation system, for example, upon request or in other instances.

In some implementations, communication between wireless-spectrum analysis devices and a data aggregation system can be based on, for example, internet protocol (IP) transport or another standard data transport protocol, which may provide more efficient data transmission. In general, messages can be transmitted from the wireless-spectrum analysis devices to the data aggregation system at any time. For example, the transmission can be triggered by detected usage of the RF spectrum, initiated by a request from the data aggregation system, sent according to a predetermined schedule or periodic intervals, or otherwise. In some instances, the aggregation system can request data from a particular wireless-spectrum analysis device.

In some examples, the wireless-spectrum analysis devices can be deployed and controlled from a back-end system. For example, the wireless-spectrum analysis devices may operate without requiring a technician on site to operate the device. In some implementations, a data aggregation system or another type of central control system can execute control operations, for example, to configure or upgrade the wireless-spectrum analysis devices. In some instances, the control system can request configure information or run internal tests on any particular wireless-spectrum analysis device.

FIG. 1 is a block diagram showing an example wireless-spectrum analysis system 100. The example wireless-spectrum analysis system 100 shown in FIG. 1 includes a network of wireless-spectrum analysis devices 110 (denoted as SI boxes) and a data aggregation system 115. As shown in FIG. 1, a number (e.g., tens, hundreds or thousands) of wireless-spectrum analysis devices 110 can be distributed over a geographic area encompassing multiple cells 105 of one or more cellular networks, with multiple wireless-spectrum analysis devices 110 in each cell 105. In some implementations, the wireless-spectrum analysis devices 110 can be distributed over another geographic region, for example, an area that does not include a cellular network. The wireless-spectrum analysis devices 110 can be identical or similar to each other; or the wireless-spectrum analysis system 100 can include a variety of different wireless-spectrum analysis devices 110.

As shown in FIG. 1, each cell 105 includes one or more base stations 120, which interface with user equipment (e.g., cellular phones, etc.) in a cellular network (e.g., a cellular voice network, cellular data network, etc.). Each cell 105 typically includes a single base station 120. Typically, the density of the base stations in a geographic region is determined based on a desired cell coverage and is computed during a cell planning stage and thus remains relatively fixed once the infrastructure has been deployed.

A base station 120 typically provides wireless service for mobile devices in a broad region, for example, over an entire cell 105. As such, the base stations 120 need enough power to transmit signals over a relatively large region, for example, to provide satisfactory cell coverage. Base stations typically use an array of high power processors or high power components with power consumption on the order of 10 Watts to 100 Watts or more, and may require cooling systems to maintain an operating temperature of the base station. For these and other reasons, base stations are often large, expensive systems. For example, a cellular base station is often composed of several antennas mounted on a tower and a building with electronics near the base of the tower, and a cellular base station can cost in the range of $100,000 to $1,000,000 or more, in some instances.

In the example shown, the wireless-spectrum analysis devices 110 provide spectral usage information to the data aggregation system 115. For example, the wireless-spectrum analysis devices 110 may send messages (e.g., IP packets, Ethernet frames, etc.) to the data aggregation system 115 through an IP cloud network, an Ethernet, or another communication system. For instance, the wireless-spectrum analysis system 100 may leverage existing communication and power infrastructure (e.g., public networks, private networks, wide area networks, etc.), other than (or including) the cellular networks supported by the base stations 120.

The example wireless-spectrum analysis devices 110 can be modular or standalone devices that that each monitor and analyze wireless signals in a local area. In some cases, the wireless-spectrum analysis devices 110 are dedicated to providing spectral usage data, without providing cellular service (e.g., to user equipment), supporting operation of the base stations 120, or otherwise operating as a component of the cellular network. For example, the wireless-spectrum analysis devices 110 can include specialized hardware (e.g., customized circuits, customized chipsets, etc.) and specialized software (e.g., signal processing and analysis algorithms) for detecting and analyzing wireless signals.

In some instances, the wireless-spectrum analysis devices 110 operate with low power consumption (e.g., around 0.1 to 0.2 Watts or less on average), and they can be relatively small and inexpensive. In some examples, an individual wireless-spectrum analysis device can be smaller than a typical personal computer or laptop computer, and can operate in a variety of environments. In some cases, the wireless-spectrum analysis devices are modular, portable, compact devices that can be installed in office spaces, on urban infrastructure, in residential areas, on vehicles, or other locations. In some cases, a wireless-spectrum analysis device can be manufactured for less than $100, although the actual cost will vary.

In the example shown in FIG. 1, the wireless-spectrum analysis devices 110 are geographically distributed more densely than the base stations 120. As such, in some instances, the wireless-spectrum analysis devices 110 can inspect the wireless-spectrum with higher location resolution and accuracy. As a particular example, a thousand wireless-spectrum analysis devices 110 may be placed in various locations within a city, with approximately fifty wireless-spectrum analysis devices 110 within each the area of each cell 105, although the actual number will vary for individual applications. Each wireless-spectrum analysis device 110 resides in a distinct location (i.e., a location that is physically distinguishable from the locations of the other wireless-spectrum analysis devices 110).

The density of the wireless-spectrum analysis devices 110 in a geographic area can be determined, for example, based on the area, population, location, or other factors of the geographic area. For instance, the density of the wireless-spectrum analysis devices 110 in an urban area may be higher than in a rural area, in some instances. In some cases, due to their relatively low cost and small size, the example wireless-spectrum analysis devices 110 can be distributed throughout a cell 105 or another region of interest to provide a more economic solution for monitoring and analyzing wireless-spectrum usage throughout the region.

The wireless-spectrum analysis system 100 can be implemented, in some cases, with a high level of flexibility in system configuration and management. For example, the wireless-spectrum analysis devices 110 can be portable, plug-and-play devices that can be relocated relatively easily, and can operate in a variety of locations. In some examples, the wireless-spectrum analysis devices 110 have standard communication interfaces (e.g., Ethernet, WiFi, USB, etc.) and accept standard power or operate on battery power. Accordingly, the configuration of the wireless-spectrum analysis system 100 (e.g., the total number, density, and relative locations of the wireless-spectrum analysis devices 110) can accommodate a variety of environments and can be modified or adjusted, for example, from time to time.

The example data aggregation system 115 can receive spectral usage information (including measurements, a digest of relevant information, etc.) sent from the wireless-spectrum analysis devices 110, store the spectral usage information (e.g., in a database), and execute algorithms that process the aggregated data from the database to extract higher-level information of the spectral usage. The higher-level information can include, for example, trends, statistics, coverage, network usage, or any other local or global information associated with the wireless-spectrum analysis devices 110. The data aggregation system 115 may also control operation of the wireless-spectrum analysis devices 110, and interact with them individually, for example, to provide software updates, to request particular data, or to perform other control operations.

Figure 2:
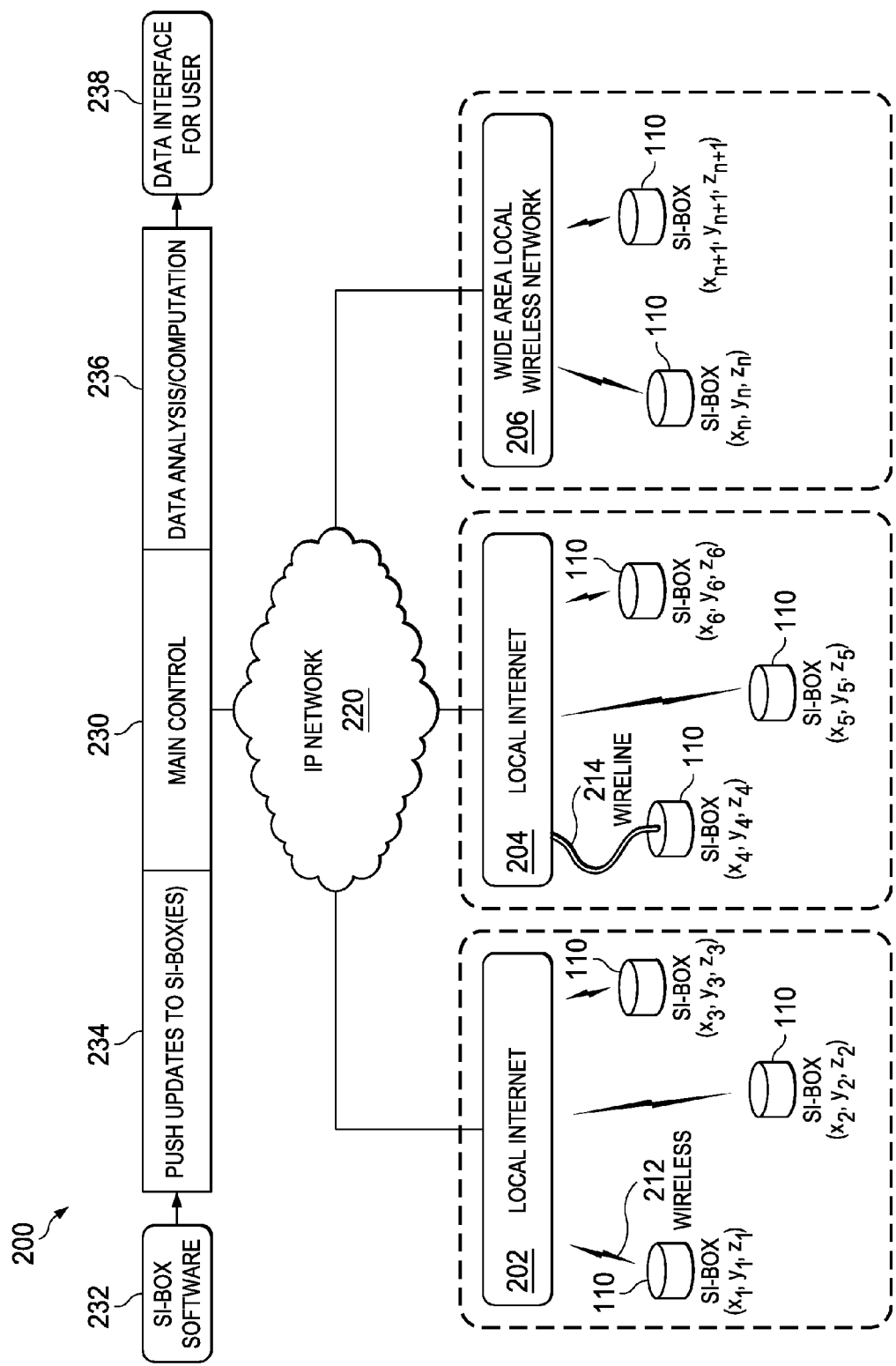
FIG. 2 is a block diagram showing architecture of an example wireless-spectrum analysis system.

FIG. 2 is a block diagram showing architecture of an example wireless-spectrum analysis system 200. The wireless-spectrum analysis system 200 can represent the wireless-spectrum analysis system 100 of FIG. 1, or another wireless-spectrum analysis system. The example wireless-spectrum analysis system 200 includes a number of wireless-spectrum analysis devices 110, an IP network 220, and a main controller 230. The wireless-spectrum analysis system 200 can include additional or different components. In some implementations, a wireless-spectrum analysis system can be arranged as shown in FIG. 2 or in another suitable manner.

In the example shown in FIG. 2, each wireless-spectrum analysis device 110 is implemented as a spectrum inspection (SI) box at a respective physical location having spatial coordinates $(x_i, y_i, z_i)$, where i varies from 1 to L (L is the number of the wireless-spectrum analysis devices 110). In some implementations, each SI box can include a Global Positioning System (GPS) or another location identification system that identifies the location coordinates of the SI box, or the location coordinates can be identified in another manner. In some implementations, each SI box has a unique identifier, and the identifier can be associated with a location identifier or location coordinates.

The example SI boxes can monitor and analyze wireless-spectrum in both frequency and time domains and perform in-depth analyses of wireless communication services available at the associated geographic location. For instance, the SI box can detect an RF signal in a local wireless environment about the location of the SI box at any given time. In some instances, the SI box can identify data packets and frames, extract synchronization information, cells and services identifiers, and quality measurements of RF channels (e.g., channel quality indicator (CQI)), and the SI box can derive spectral-usage parameters based on these and other control information and traffic data of the RF signal detected by the SI box. The control information and traffic data of the RF signal can include physical and medium access (MAC) layers information corresponding to a wireless communication standard such as, 2G GSM/EDGE, 3G/CDMA/UMTS/TD-SCDMA, 4G/LTE/LTE-A, WiFi, Bluetooth, etc. The spectral-usage parameters (e.g., for particular frequencies, or particular bandwidths, etc.) can include the power of detected RF signals, the signal-to-noise ratio (SNR) of detected RF signals, the frequency at which detected RF signals have maximum power, or other parameters. In some implementations, the SI box can identify RF jammers and interferers, or other types of information.

In the example shown in FIG. 2, data from the SI boxes (e.g., the spectral-usage parameters or other information) are aggregated by a data aggregation or central control system (e.g., the main controller 230). In some implementations, data from the SI boxes are aggregated by the main controller 230 by receiving the messages transmitted from the SI boxes, for example, through the IP network (e.g., the IP network 220). In some implementations, the SI boxes are connected to the IP network 220 via a local network (e.g., a local internet 202 or 204). The SI boxes can be connected to the local network by a local wireline network 214 or a wireless network 212. The wireline network 214 can include, for example, Ethernet, xDSL (x-digital subscriber line), optical network, or other types of wireline communication networks. The wireless network 212 can include, for example, WiFi, Bluetooth, NFC, or other types of local wireless networks. In some implementations, some of the SI boxes are connected directly to the IP network 220 using one or more wide area networks 206. The wide area networks 206 can include, for example, cellular network, satellite network, or other types of wide area networks.

The example main controller 230 can be included in the data aggregation system 115 of FIG. 1 or another back-end system. The main controller 230 can be a computing system that includes one or more computing devices or systems. The main controller 230 or any of its components can be located at a data processing center, a computing facility, or another location. In the example shown, the main controller 230 can remotely control operation of the SI boxes. Example functions of the main controller 230 can include aggregating the information from some or all of the SI boxes, upgrading the SI box software, monitoring states of the SI boxes, etc. For example, the main controller 230 can send software updates to some or all SI boxes.

In the example shown in FIG. 2, the main controller 230 can put the SI boxes into one or more calibration or test modes, reset various elements within the SI boxes, or configure any individual SI box as necessary, for example, based on the location or state of the SI box, its neighboring SI boxes, or other factors. In some examples, the states of an SI box can include: (i) the temperature of the SI box, (ii) the current power consumption of the SI box, (iii) the data rate flowing from the SI box back to the main controller 230, (iv) the signal strength, SSID's, or MAC addresses of the local WiFi signals around the SI box, (v) the location of the SI box (e.g., detected an internal GPS unit in the SI box), (vi) a signal (e.g., IP packets, control signaling transmitted over the network) that provides information on the state of the SI box or its surrounding SI boxes. The main controller 230 may monitor additional or different states of the SI boxes.

In some implementations, the main controller 230 can include or be coupled to a communication system that receives spectrum inspection information (e.g., spectral-usage parameters, spatial and temporal coordinates for each of the spectral-usage parameters, states of the SI boxes, etc.) transmitted from the SI boxes. The main controller 230 can include or be coupled to a data analysis system 236 that can aggregate (e.g., assemble, compile or otherwise manage) the spectrum inspection information from the multiple SI boxes and generate a spectral-usage report for the geographic region based on the spectral-usage parameters from the SI boxes.

Figure 3:
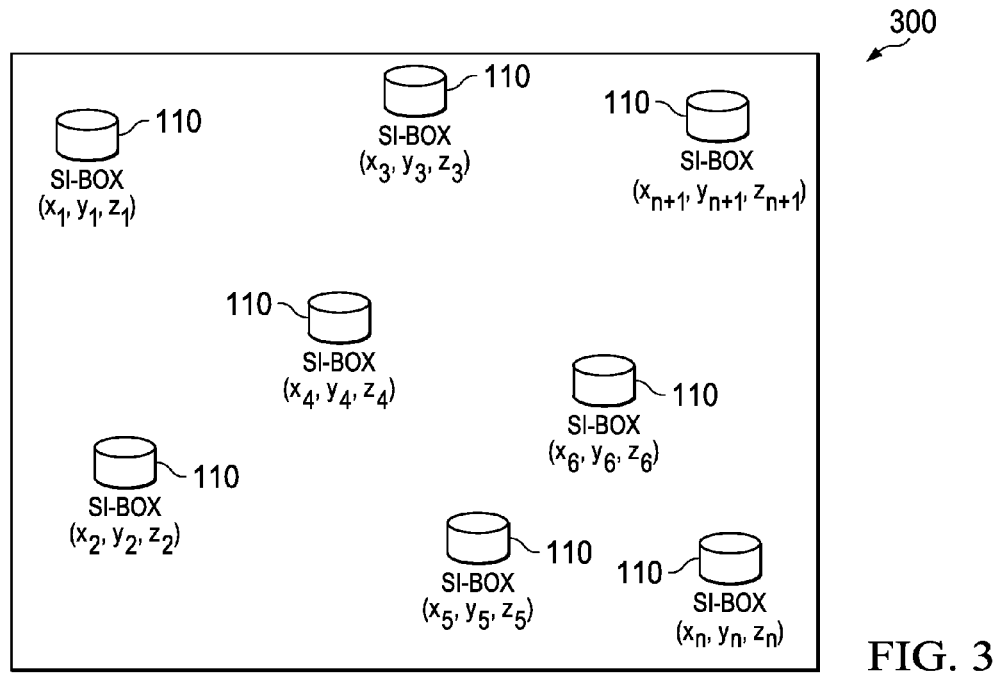
FIG. 3 is a block diagram showing an example distribution of wireless-spectrum analysis devices.
Figure 4:
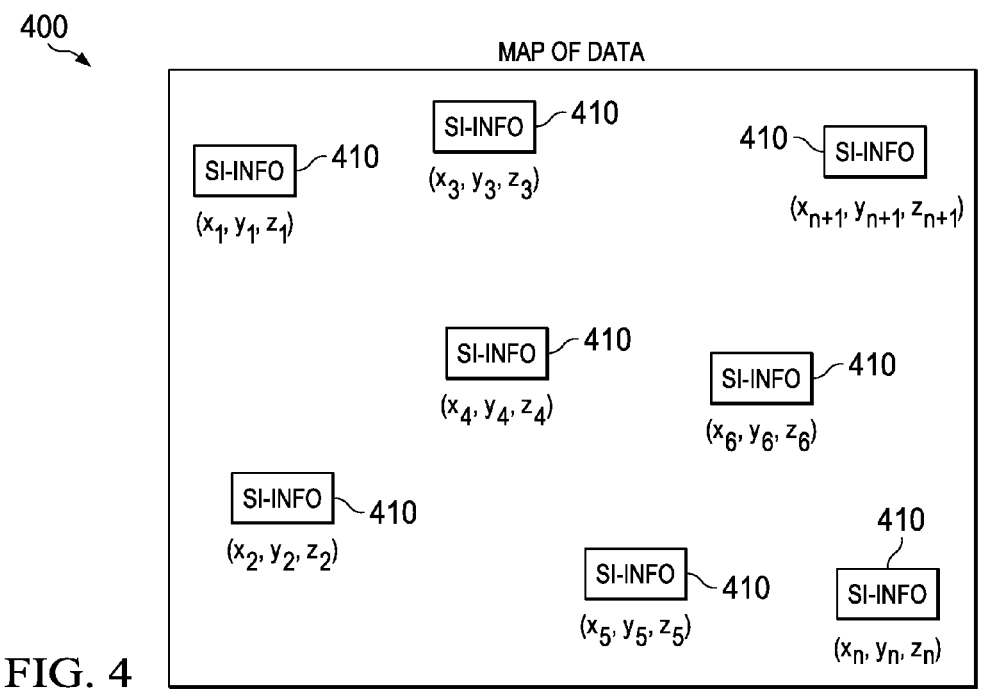
FIG. 4 is a block diagram showing example spectrum inspection (SI) information associated with wireless-spectrum analysis devices.
Figure 5:
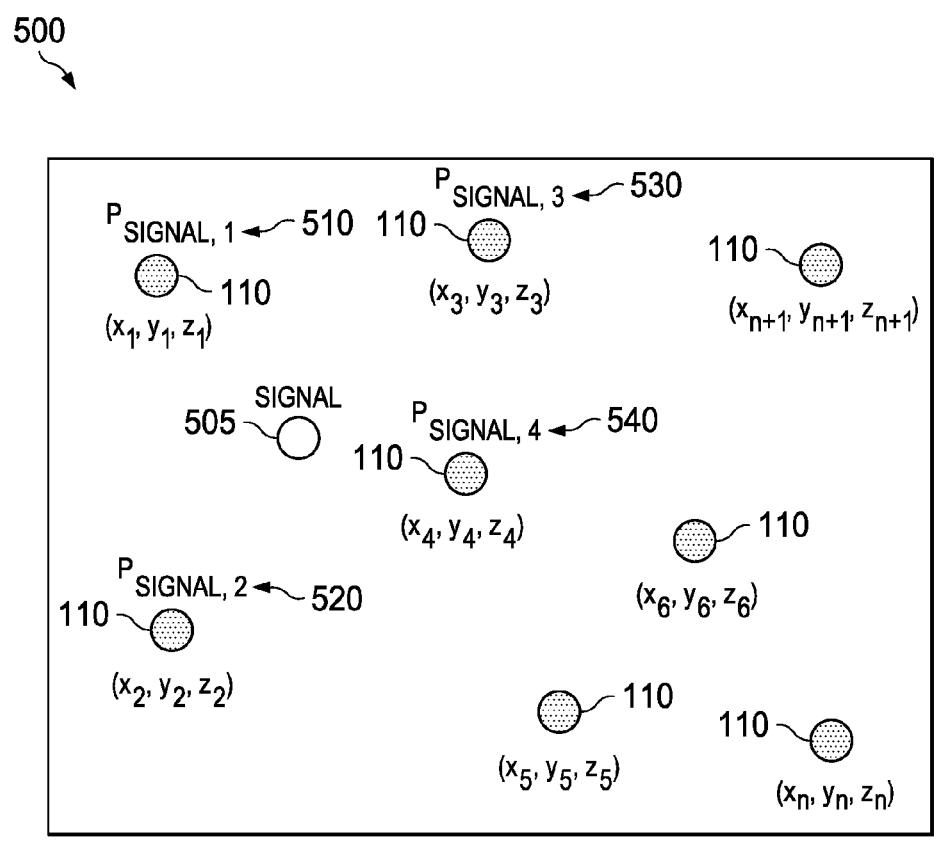
FIG. 5 is another block diagram showing example SI information associated with wireless-spectrum analysis devices.

In some instances, the spectral-usage report can be presented on a data interface 238 to present users the usage, quality, or other information of the wireless-spectrum over the various locations of the SI boxes. For example, the spectral-usage report can indicate detected wireless traffic levels in each of the multiple bandwidths in an RF spectrum, detected wireless traffic levels for multiple wireless communication standards, spatial and temporal distributions of wireless-spectrum usage in the geographic region, or other information. The traffic levels can include, for example, throughput, data rate, peak and valley values, or other statistics (e.g., average and variance) of the spectral usage information. The spectral-usage report can include, for example, tables, charts, and graphs showing the detected wireless traffic levels versus space and time. For instance, the spectral-usage report can include a graph or map (e.g., as shown in FIGS. 3-5) showing the spatial distribution of wireless-spectrum usage in the geographic region. The spectral-usage report can include a bar chart or table showing the temporal distribution or trends of wireless-spectrum usage (e.g., showing the peak, average, and valley traffic amount during a day, a month, or a year).

In some implementations, the data analysis system 236 can analyze real-time data, historical data, or a combination of both, and determine spectral-usage parameters for a geographic region. For example, the data analysis system 236 can determine a source location for the wireless signals received by the SI boxes; and the generated spectral-usage report can include an indication of the source location.

FIGS. 3 and 4 show aspects of example spatial and temporal distributions of wireless-spectrum usage in a geographic region; FIG. 5 shows aspects of example techniques for determining the source location. In some instances, similar or related information can be included in a spectral-usage report generated by the main controller 230 and displayed to the users. In some implementations, the spectral-usage report can include additional or different representations of the spectral-usage information.

FIG. 3 is a block diagram 300 showing an example spatial distribution of wireless-spectrum analysis devices (e.g., the SI boxes). As shown in FIG. 3, each SI box has a geographic location $(x_i, y_i, z_i)$ and can monitor and analyze the wireless-spectrum at its respective geographic location $(x_i, y_i, z_i)$. Each SI box can transmit spectrum inspection (SI) information to a data aggregation system (e.g., the main controller 230 in FIG. 2). The SI information can include, for example, spectrum data (e.g., spectral-usage parameters), location and time information for each spectral-usage parameter, state information of the SI box, or other information. For example, the location and time information can include spatial coordinates of the SI box (e.g., $(x_i, y_i, z_i)$ or in other coordinates) and temporal coordinates (e.g., a time of day) at which each of the spectral-usage parameters is obtained. The example block diagram 300 shows the spatial coordinates of the SI boxes and serves as a map of the example spatial distribution of the SI boxes in a geographic region. In some implementations, the SI information of each SI box can be superimposed onto the diagram 300 and displayed, for example, to a user.

FIG. 4 is block diagram 400 showing example SI information 410 associated with the SI boxes shown in FIG. 3. In the example shown in FIG. 4, the example SI information 410 can be displayed adjacent to or on top of the respective spatial coordinates of the SI boxes. The displayed SI information 410 can include some or all types of SI information described above. For example, one or more of the spectral-usage parameters can be displayed. In some implementations, temporal coordinates for each of the spectral-usage parameters can also be displayed. The information can be the same, similar, or different for each distinct SI box. Because the SI information 410 can be aggregated at a central location (e.g., the main controller 230), the SI information 410 of multiple SI boxes can be correlated, compared, interpolated, or otherwise manipulated to derive further information. For example, the relative position of a source signal can be determined based on SI information of the SI boxes that can detect the source signal. Additional or different information can be derived.

FIG. 5 is another block diagram 500 showing example SI information associated with the SI boxes shown in FIG. 3. In this example, a detected signal power at one or more frequencies is displayed as the example SI information for each SI box at its respective location. The measured power of the signal at frequency f at locations $(x_1, y_1, z_1)$, $(x_2, y_2, z_2)$, $(x_3, y_3, z_3)$, and $(x_4, y_4, z_4)$ are denoted as $P_{signal,1}$ 510, $P_{signal,3}$ 520, $P_{signal,2}$ 530, and $P_{signal,4}$ 540, respectively. Based on the measured power levels of the multiple SI boxes, the source location of the signal 505 at frequency f can be estimated, for example, automatically by a data analysis system (e.g., of the central controller). For example, the source location of the signal 505 can be determined based on the intersection of multiple arcs centered at the locations of the SI boxes, e.g., $(x_1, y_1, z_1)$, $(x_2, y_2, z_2)$, $(x_3, y_3, z_3)$, and $(x_4, y_4, z_4)$. The radius of each arc can be determined based on the $P_{signal,1}$ 510, $P_{signal,3}$ 520, $P_{signal,2}$ 530, and $P_{signal,4}$ 540, the respective path losses, shadowing effects, or other propagation conditions in the local wireless environment about each of the multiple SI boxes. Accordingly, the source location of the RF signals can be pinpointed and illustrated on the example map for visualization.

Figure 6:
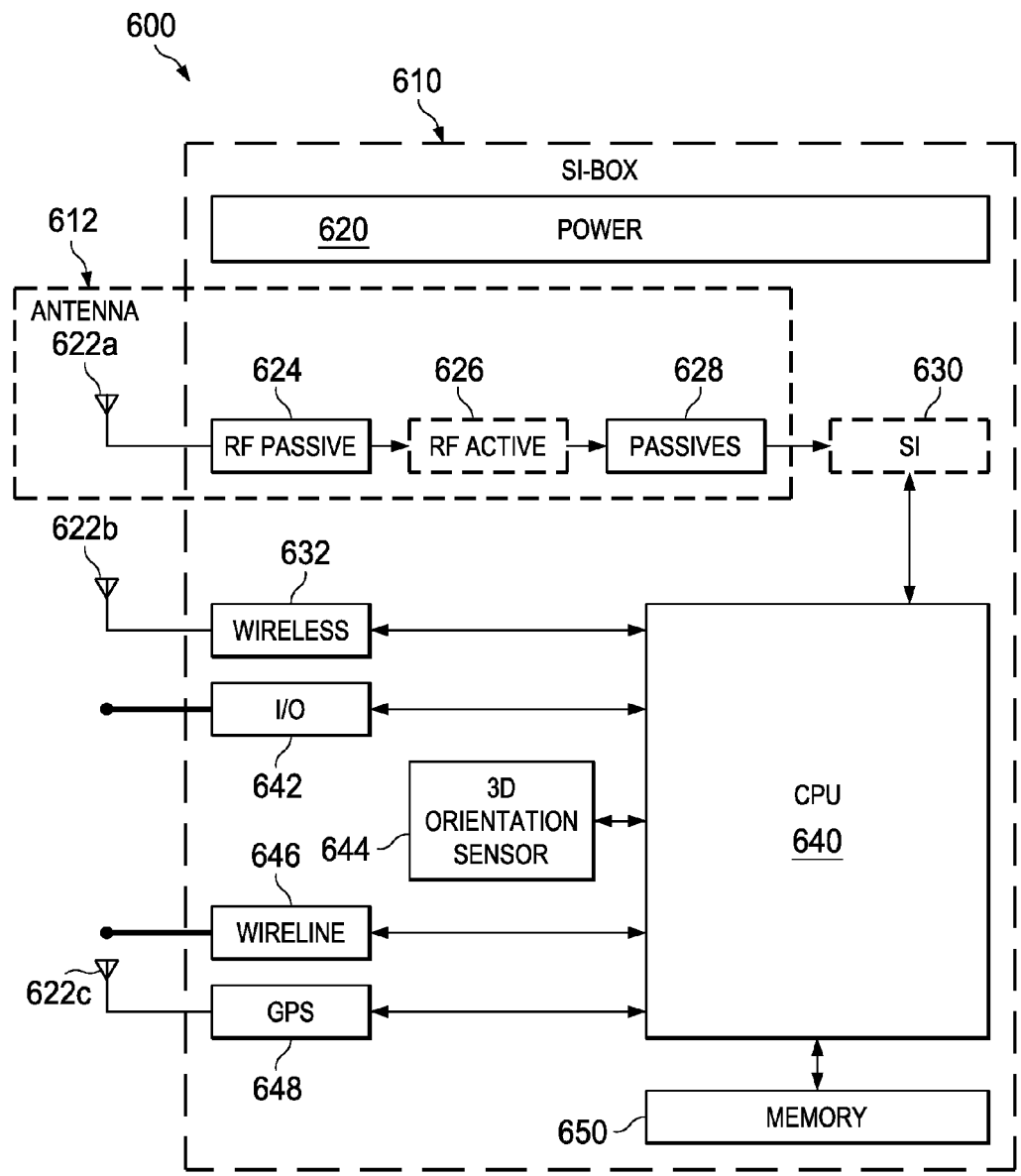
FIG. 6 is a block diagram showing an example wireless-spectrum analysis device.

FIG. 6 is a block diagram showing an example wireless-spectrum analysis device 600. In some cases, the SI boxes of FIGS. 1-5 can be implemented as the example wireless-spectrum analysis device 600 shown in FIG. 6 or as another type of wireless-spectrum analysis device. The example wireless-spectrum analysis device 600 includes a housing 610, an RF interface 612, a power management subsystem 620, a signal analysis subsystem (e.g., the SI subsystem 630, etc.), a CPU 640, a memory 650, communication interfaces, an input/output interface 642 (e.g., a USB connection), a GPS interface 648, and one or more sensors (e.g., 3D orientation sensors 644 such as a compass or gyroscope, temperature sensors, etc.). The wireless-spectrum analysis device 600 can include additional or different components and features, and the features of the wireless-spectrum analysis device can be arranged as shown in FIG. 6 or in another suitable configuration.

In some implementations, the housing 610 can be a portable housing that houses the RF interface 612, the power management subsystem 620, the signal analysis subsystem, the communication interfaces, and other components of the wireless-spectrum analysis device 600. The housing can be made of plastic, metal, composites, or a combination of these and other materials. The housing can include components that are manufactured by molding, machining, extruding, or other types of processes. In some implementations, the wireless-spectrum analysis device 600 can be coupled to or integrated with another device (e.g., a pico/femto cell box of a cellular system, a WiFi access point or base station, a vehicle, a router, a mobile device, a thermostat, etc.). For example, the housing 610 of the wireless-spectrum analysis device 600 can be attached to, incorporated, or otherwise coupled to the other device. Alternatively, the housing 610 can be a dedicated housing that houses only the components of the wireless-spectrum analysis device 600.

In some implementations, the design and arrangement of the housing 610 and components inside the housing 610 can be optimized or otherwise configured for monitoring and analyzing wireless-spectrum usage. For example, the sizes, orientations, and relative locations of the components can be optimized for detecting and analyzing RF signals, and the device can be compact while accommodating all the necessary components. In some instances, the housing 610 can be on the order of, for example, $10 \times 10 \times 4$ cm$^3$; or another size housing can be used.

In some implementations, the RF interface 612 is configured to detect RF signals in multiple bandwidths of an RF spectrum in a local wireless environment about the wireless-spectrum analysis device 600. The RF interface 612 can include an antenna system and multiple radio paths that are configured to process RF signals in the respective bandwidths. In the example shown in FIG. 6, the RF interface 612 includes an antenna 622a, RF passive elements 624, RF active elements 626, and passive elements 628. The RF passive elements 624 can include, for example, matching elements, RF switches, and filters. The RF active elements 626 can include, for example, RF amplifiers. The passive elements 628 after the RF active elements 626 can include, for example, filters, matching elements, switches, and baluns.

In some examples, the signal analysis subsystem can be configured to identify the spectral-usage parameters based on the RF signals. A signal analysis subsystem can include radio(s), digital signal processor (DSP), memory, and other components for extracting spectral parameters and for analyzing the RF spectrum. In some implementations, the combination of the RF interface 612 and the signal analysis subsystem can be referred to as a spectrum inspection (SI) signal path, which is described in greater detail with respect to FIG. 7.

The communication interfaces of the wireless-spectrum analysis device 600 can be configured to transmit the spectral-usage parameters or other SI information to a remote system (e.g., the main controller 230 of FIG. 2). The communication interfaces can include, one or more wireless interfaces 632 (e.g., a WiFi connection, cellular connection, etc.), a wireline interface 646 to a local network (e.g., an Ethernet connection, xDSL connection, etc.) or other types of communication links or channels. The communication interfaces can share and reuse the common antennas (e.g., using an antenna array) or they can each have distinct and dedicated antennas.

The wireless interface 632 and the wireline interface 646 can each include a modem to communicate with the local or wide area network. For example, the wireless interface 632 and the wireline interface 646 can send SI information to a data aggregation system (e.g., the main controller 230 of FIG. 2) and receive control information (e.g., software updates) from the data aggregation system, via the local or wide area network. In some implementations, a wireless-spectrum analysis device can be equipped with either or both of the communication interfaces. The wireline interface 646 can allow the example wireless-spectrum analysis device 600 to exploit existing wireline communication infrastructure (e.g., in a building) and large transmission capacity of wireline communications (e.g., large bandwidth provided by optical network, advanced digital subscriber line technologies, etc.). The wireless interface 632 can enhance the mobility and flexibility of the example wireless-spectrum analysis device 600 such that it can deliver SI information at a variety of locations and times, using Bluetooth, WiFi, cellular, satellite, or other wireless communication technologies.

In some implementations, the wireless interface 632 and the RF interface 612 can share hardware or software components (or both). In some implementations, the wireless interface 632 and the RF interface 612 can be implemented separately. In some implementations, the RF interface 612 is mainly responsible for signal reception rather than transmission, and the RF interface 612 can be implemented with specialized lower-power circuitry and thus reduce the overall power consumption of the wireless-spectrum analysis device 600.

The power management subsystem 620 can include circuits and software for providing and managing power to the wireless-spectrum analysis device 600. In some implementations, the power management subsystem 620 can include a battery interface and one or more batteries (e.g., rechargeable batteries, a smart battery with an embedded microprocessor, or a different type of internal power source). The battery interface may be coupled to a regulator, which may assist the battery in providing direct current electrical power to the wireless-spectrum analysis device 600. As such, the wireless-spectrum analysis device 600 can include a self-contained power supply and can be used at arbitrary locations without need for other external energy sources. Additionally or alternatively, the power management subsystem 620 can include an external power interface that receives power from an external source (e.g., an alternating current power source, an adapter, a converter, etc.). As such, the wireless-spectrum analysis device 600 can be plugged into an external energy source.

In some implementations, the power management subsystem 620 can oversee and manage power consumption of the wireless-spectrum analysis device 600. For example, the power management subsystem 620 can monitor the power consumption of the RF interface 612, communication interfaces, the CPU 640, and other components of the wireless-spectrum analysis device 600, and report the power consumption state of the wireless-spectrum analysis device 600, for example, to a central controller. In some implementations, the wireless-spectrum analysis device 600 can be designed to have low power consumption and the power management subsystem 620 can be configured to send an alert to the central controller or intervene with the operations of the wireless-spectrum analysis device 600 if the power consumption exceeds a threshold. The power management subsystem 620 can include additional or different features.

The CPU 640 can include one or more processors or another type of data-processing apparatus that can execute instructions, for example, to manage the operations of the wireless-spectrum analysis device 600. The CPU 640 may perform or manage one or more of the operations of a wireless-spectrum analysis device described with respect to FIGS. 1-5. In some implementations, the CPU 640 can be part of the SI subsystem 630. For example, the CPU 640 can process, compute, and otherwise analyze the measured wireless-spectrum data (e.g., from the RF interface 612). In some cases, the CPU 640 can execute or interpret software, scripts, programs, functions, executables, or other modules contained in the memory 650.

The input/output interface 642 can be coupled to input/output devices (e.g., a USB flash drive, a display, a keyboard, or other input/output devices). The input/output interface 642 can assist data transfer between the wireless-spectrum analysis device 600 and the external storage or display device, for example, over communication links such as a serial link, a parallel link, a wireless link (e.g., infrared, radio frequency, or others), or another type of link.

The memory 650 can include, for example, a random access memory (RAM), a storage device (e.g., a writable read-only memory (ROM) or others), a hard disk, or another type of storage medium. The memory 650 can store instructions (e.g., computer code) associated with operations of the wireless-spectrum analysis device 600, a main controller, and other components in a wireless-spectrum analysis system. The memory 650 can also store application data and data objects that can be interpreted by one or more applications or virtual machines running on the wireless-spectrum analysis device 600. The memory 650 can store, for example, location data, environment data, and state data of the wireless-spectrum analysis device 600, wireless-spectrum data, and other data.

In some implementations, the wireless-spectrum analysis device 600 can be programmed or updated (e.g., reprogrammed) by loading a program from another source (e.g., from a central controller through a data network, a CD-ROM, or another computer device in another manner). In some instances, the central controller pushes software updates to the wireless-spectrum analysis device 600 as the updates become available, according to a predetermined schedule, or in another manner.

Figure 7:
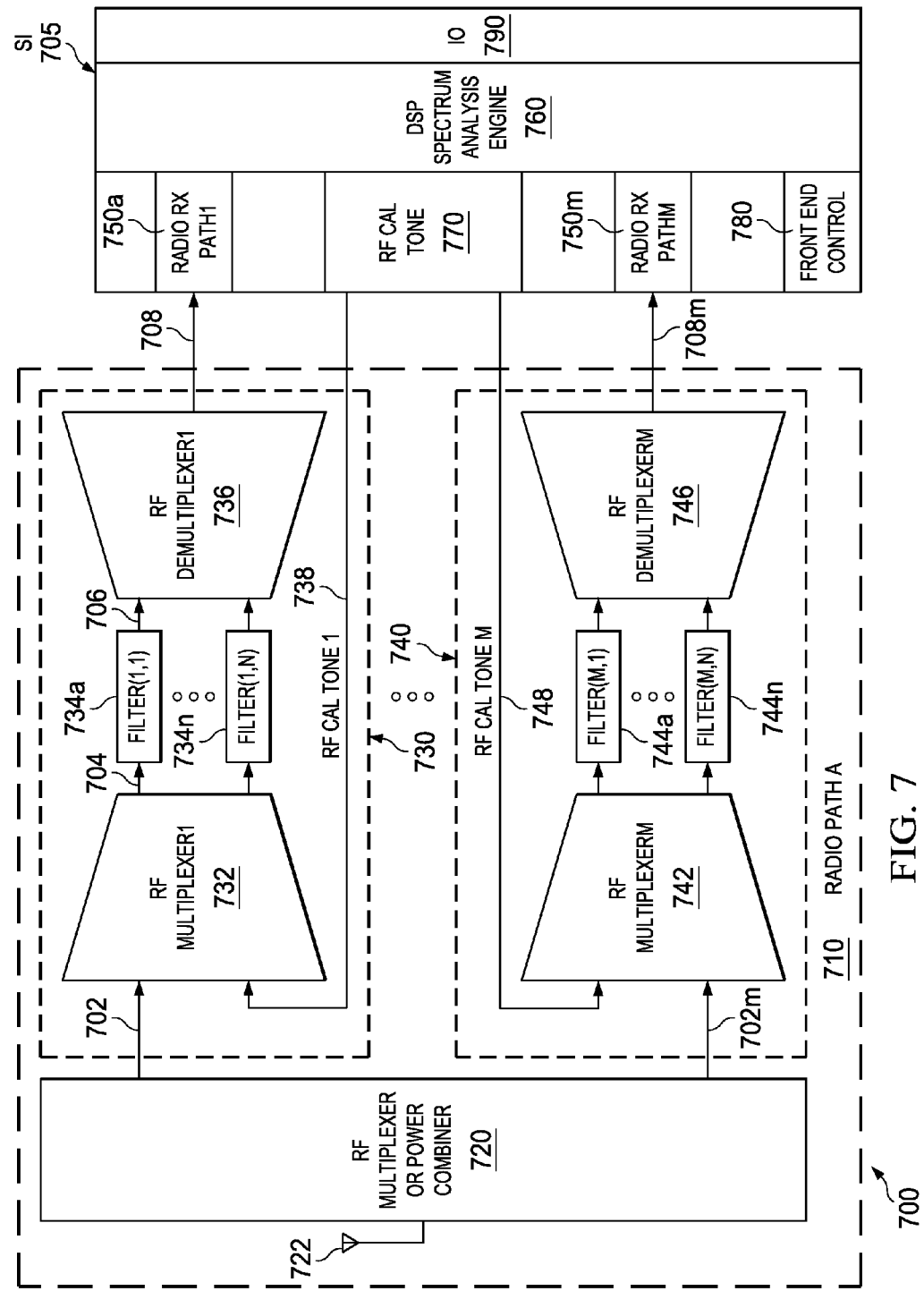
FIG. 7 is a block diagram showing an example SI signal path of a wireless-spectrum analysis device.

FIG. 7 is a block diagram showing an example spectrum inspection (SI) signal path 700. The SI signal path 700 includes an RF interface 710 (e.g., denoted as Radio Path A) and a spectrum analysis subsystem 705. The RF interface 612 of the wireless-spectrum analysis device 600 of FIG. 6 can be implemented as the example RF interface 710 in FIG. 7 or in another manner. The SI subsystem 630 of the wireless-spectrum analysis device 600 of FIG. 6 can be implemented as the example spectrum analysis subsystem 705 in FIG. 7 or in another manner. In some cases, the SI signal path 700 can perform all necessary operations for monitoring and analyzing the wireless-spectrum usage. For example, the SI signal path 700 can perform functions of a typical wireless receiver such as demodulation, equalization, channel decoding, etc. The SI signal path 700 can support signal reception of various wireless communication standards and access the spectrum analysis subsystem 705 for analyzing the wireless-spectrum usage.

In the example shown, the RF interface 710 can be a wideband or narrowband front-end chipset for detecting and processing RF signals. For example, the RF interface 710 can be configured to detect RF signals in a wide spectrum of one or more frequency bands, or a narrow spectrum within a specific frequency band of a wireless communication standard. In some implementations, an SI signal path 700 can include one or more RF interfaces 710 to cover the spectrum of interest. Example implementations of such an SI signal path are described with respect to FIG. 8.

In the example shown in FIG. 7, the RF interface 710 includes one or more antennas 722, an RF multiplexer 720 or power combiner (e.g., an RF switch), and one or more signal processing paths (e.g., "path 1" 730, . . . , "path M" 740). The antenna 722 could be a multi-port antenna or single-port antenna. The antenna 722 can include an omnidirectional antenna, a directional antenna, or a combination of one or more of each. The antenna 722 is connected to an RF multiplexer 720. In some implementations, the RF interface 710 can be configured to use the one or more antennas 722 for detecting the RF signals based on single-input single-output (SISO), single-input and multiple-output (SIMO), multiple-input and single-output (MISO) or multiple-input and multiple-output (MIMO) technologies.

In some implementations, an RF signal in the local environment of an SI box can be picked up by the antenna 722 and input into the RF multiplexer 720. Depending on the frequency of the RF signal that needs to be analyzed, the signal 702 output from the RF multiplexer 720 can be routed to one of the processing paths (i.e., "path 1" 730, . . . , "path M" 740). Here M is an integer. Each path can include a distinct frequency band. For example, "path 1" 730 may be used for RF signals between 1 GHz and 1.5 GHz, while "path M" may be used for RF signals between 5 GHz and 6 GHz. The multiple processing paths may have a respective central frequency and bandwidth. The bandwidths of the multiple processing paths can be the same or different. The frequency bands of two adjacent processing paths can be overlapping or disjointed. In some implementations, the frequency bands of the processing paths can be allocated or otherwise configured based on the assigned frequency bands of different wireless communication standards (e.g., GSM, LTE, WiFi, etc.). For example, it can be configured such that each processing path is responsible for detecting RF signals of a particular wireless communication standard. As an example, "path 1" 730 may be used for detecting LTE signals while the "path M" 740 may be used for detecting WiFi signals.

Each processing path (e.g., "processing path 1" 730, "processing path M" 740) can include one or more RF passive and RF active elements. For example, the processing path can include an RF multiplexer, one or more filters, an RF de-multiplexer, an RF amplifier, and other components. In some implementations, the signal 702 output from the RF multiplexer 720 can be applied to a multiplexer in a processing path (e.g., "RF multiplexer 1" 732, . . . , "RF multiplexer M" 742). For example, if "processing path 1" 730 is selected as the processing path for the signal 702, the signal 702 can be fed into "RF multiplexer 1" 732. The RF multiplexer can choose between the signal 702 coming from the first RF multiplexer 720 or the RF calibration (cal) tone 738 provided by the spectrum analysis subsystem 705. The output signal 704 of "RF multiplexer 1" 732 can go to one of the filters, Filter (1,1) 734a, . . . , Filter (1,N) 734n, where N is an integer. The filters further divide the frequency band of the processing path into a narrower band of interest. For example, "Filter (1,1)" 734a can be applied to the signal 704 to produce a filtered signal 706, and the filtered signal 706 can be applied to "RF de-multiplexer 1" 736. In some instances, the signal 706 can be amplified in the RF de-multiplexer. The amplified signal 708 can then be input into the spectrum analysis subsystem 705.

The spectrum analysis subsystem 705 can be configured to convert the detected RF signals into digital signals and perform digital signal processing to identify spectral-usage parameters for the RF spectrum based on the detected RF signals. The spectrum analysis subsystem 705 can include one or more SI radio receive (RX) paths (e.g., "SI radio RX path 1" 750a, "SI radio RX path M" 750m), a DSP spectrum analysis engine 760, an RF calibration (cal) tone generator 770, a front end control module 780, and an I/O 790. The spectrum analysis subsystem 705 may include additional or different components and features.

In the example shown, the amplified signal 708 is input into "SI radio RX path 1" 750a, which down-converts the signal 708 into a baseband signal and applies gain. The down-converted signal can then be digitalized via an analog-to-digital converter. The digitized signal can be input into the DSP spectrum analysis engine 760. The DSP spectrum analysis engine 760 can, for example, identify packets and frames included in the digital signal, read preambles, headers, or other control information embedded in the digital signal (e.g., based on specifications of a wireless communication standard), determine the signal power and SNR of the signal at one or more frequencies or over a bandwidth, channel quality and capacity, traffic levels (e.g., data rate, retransmission rate, latency, packet drop rate, etc.), or other spectral-usage parameters. The output (e.g., the spectral-usage parameters) of the DSP spectrum analysis engine 760 can be applied and formatted to the I/O 790, for example, for transmission of the spectral-usage parameters to the data aggregation system via one or more communication interfaces of the wireless-spectrum analysis device.

The RF calibration (cal) tone generator 770 can generate RF calibration (cal) tones for diagnosing and calibration of the radio RX paths (e.g., "radio RX path 1" 750a, . . . "radio RX path M" 750m). The radio RX paths can be calibrated, for example, for linearity and bandwidth.

Figure 8:
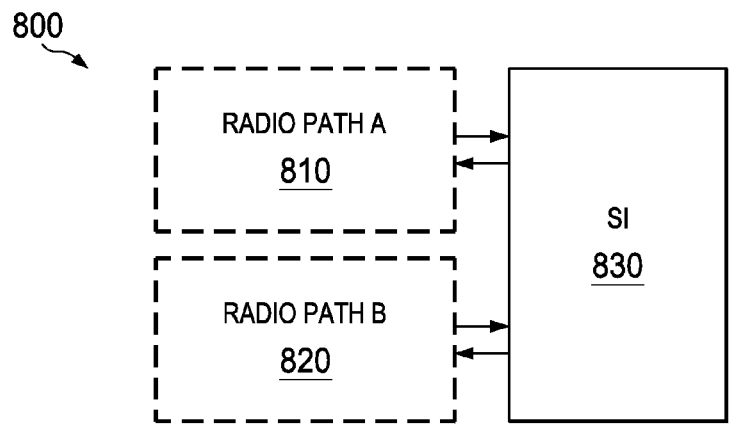
FIG. 8 is a block diagram showing another example SI signal path of a wireless-spectrum analysis device.

FIG. 8 is a block diagram showing another example implementation of an SI signal path 800 of a wireless-spectrum analysis device. In some instances, the SI signal path can include more than one RF interfaces (radio paths) that are connected to multiple different antennas. In the example shown in FIG. 8, the SI signal path 800 includes a radio path A 810 and a radio path B 820, each coupled to a spectrum analysis subsystem 830. The radio path A 810 and radio path B 820 can be configured in a similar manner as the RF interface or radio path A 710 of FIG. 7, or they can be configured in another manner. The radio path A 810 and radio path B 820 can have the same or different configuration, for example, covering the same or different frequency bands for wireless-spectrum monitoring and analysis.

Figure 9:
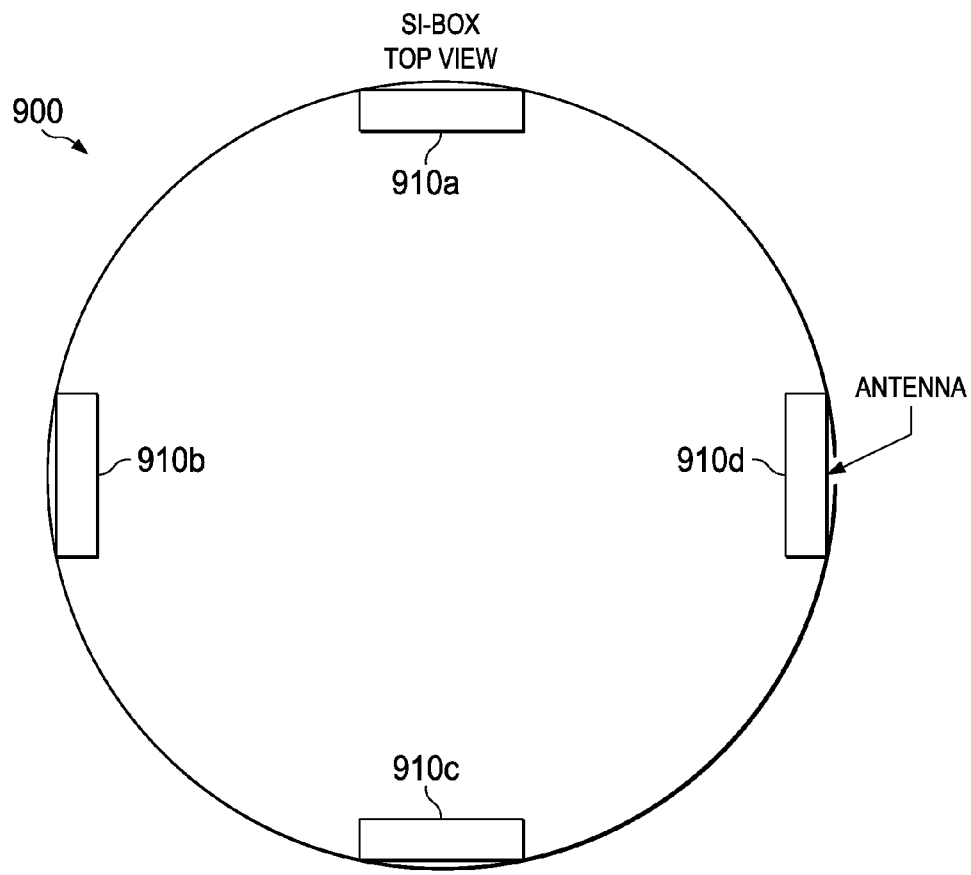
FIG. 9 is a top view of an example wireless-spectrum analysis device.

FIG. 9 is a top view of an example wireless-spectrum analysis device 900. In some cases, the SI boxes of FIGS. 1-5 can be implemented as the example wireless-spectrum analysis device 900 shown in FIG. 9 or as another type of wireless-spectrum analysis device. The example wireless-spectrum analysis device 900 in FIG. 9 can include some or all of the features shown in FIGS. 6-7, or the wireless-spectrum analysis device 900 in FIG. 9 can include fewer, additional or different features. The wireless-spectrum analysis device 900 can include one or more antennas, for example, connected to one or more RF interfaces inside a housing of the wireless-spectrum analysis device 900. For instance, the antennas of the example wireless-spectrum analysis device 900 can be the antennas 622a-c of FIG. 6 or the antenna 722 of FIG. 7.

The antennas can be strategically arranged on the wireless-spectrum analysis device 900 for reception of RF signals. The example wireless-spectrum analysis device 900 shown in FIG. 9 includes four antennas 910a-d placed ninety degrees from each other relative to the center of the wireless-spectrum analysis device 900. In some instances, the antennas can be arranged with a different degree of separation, orientation, or position, for example, based on the total number of antennas, the antenna profiles, the location and orientation of the wireless-spectrum analysis device 900, or other factors.

Figure 10:
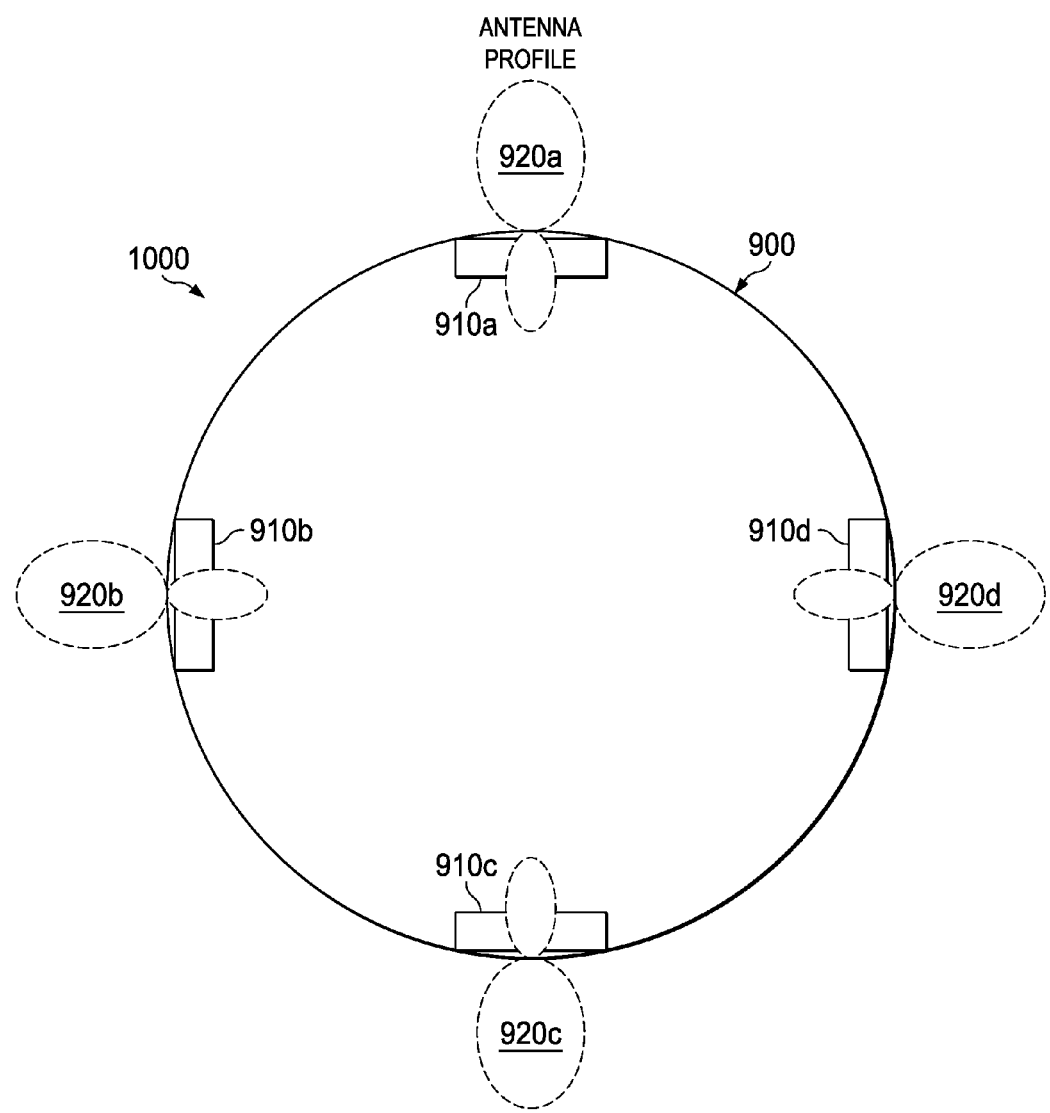
FIG. 10 is a top view of example antenna profiles of the antennas 910a-d of the example wireless-spectrum analysis device 900 of FIG. 9.

FIG. 10 is a top view 1000 of example antenna profiles of the antennas 910a-d of the example wireless-spectrum analysis device 900 of FIG. 9. In the example shown in FIG. 10, the antennas 910a-d have respective antenna profiles or patterns 920a-d, respectively. The antenna profiles 920a-d can be the same or different. The antenna profiles 920a-d can be selected or otherwise configured, for example, based on the frequency or frequency band of interest, the desired antenna gain, or other factors.

Figure 11:
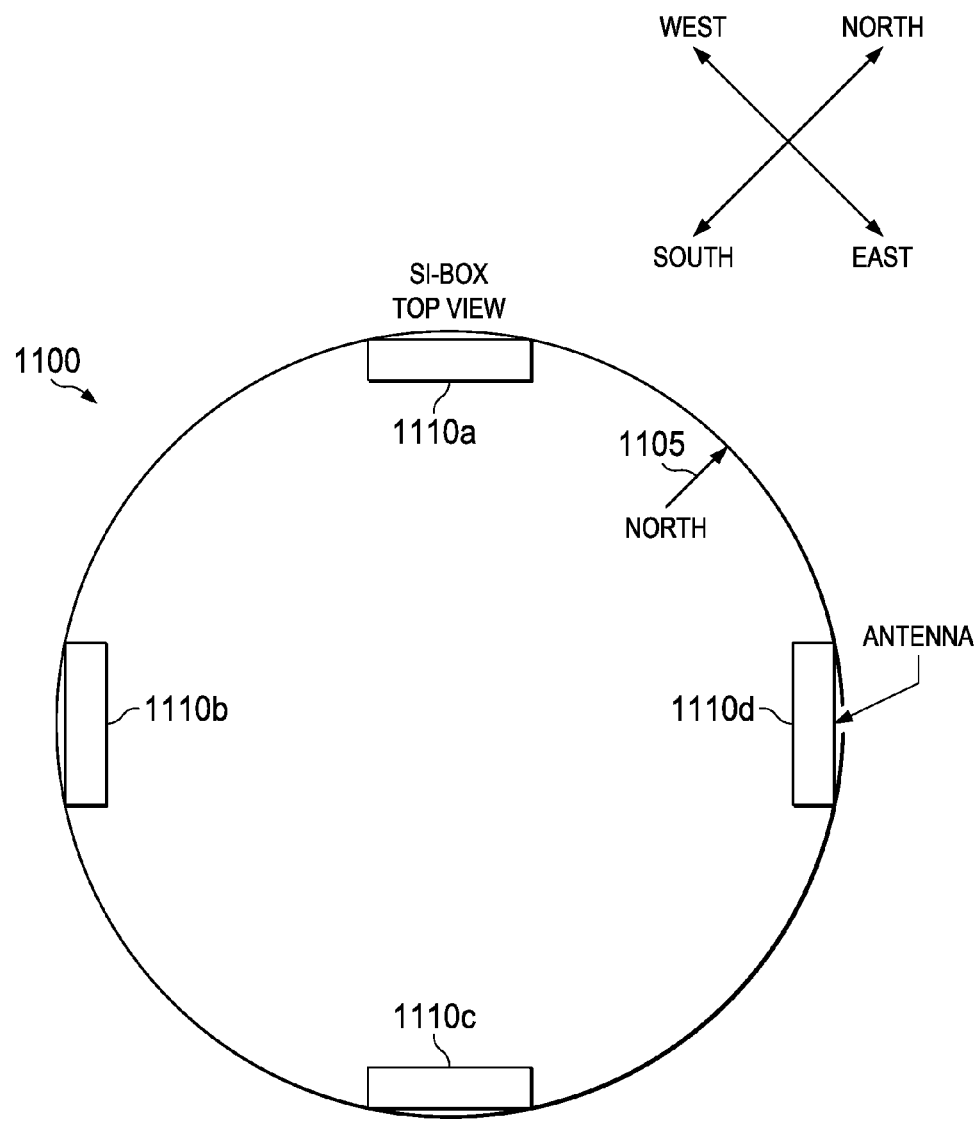
FIG. 11 is a top view of another example wireless-spectrum analysis device.

FIG. 11 is a top view of another example wireless-spectrum analysis device 1100. In some cases, the SI boxes of FIGS. 1-5 can be implemented as the example wireless-spectrum analysis device 1100 shown in FIG. 11 or as another type of wireless-spectrum analysis device. The example wireless-spectrum analysis device 1100 in FIG. 11 can include some or all of the features shown in FIGS. 6-10, or the wireless-spectrum analysis device 1100 in FIG. 11 can include fewer, additional or different features.

The wireless-spectrum analysis device 1100 includes four antennas 1110a-d and a reference direction indicator 1105 on the wireless-spectrum analysis device 1100. In some cases, the antennas 1110a-d are oriented or configured with respect to cardinal directions or another coordinate system according to the reference direction indicator 1105. In the example shown in FIG. 11, the reference direction indicator 1105 is oriented along the North compass direction. Another reference direction can be used. The orientations and displacements of the antennas 1110a-d can be identified and, in some cases, adjusted with respect to the reference direction indicator 1105.

In some implementations, a wireless-spectrum analysis device can be a portable, modular device. For example, some wireless-spectrum analysis devices can be moveable or reconfigurable for use in multiple locations (e.g., in series), without having to substantially deconstruct or disassemble the device. In some cases, wireless-spectrum analysis devices are interchangeable with each other, so that the network of wireless-spectrum analysis devices can be conveniently upgraded, expanded, tailored, or otherwise modified.

In some cases, a wireless-spectrum analysis device can be installed by one or more operators, for example, by positioning the device and connecting it to standard power and data links. In some cases, a wireless-spectrum analysis device can be secured in place by fasteners (e.g., screws, bolts, latches, adhesive, etc.), or a wireless-spectrum analysis device can rest in a free position (e.g., without fasteners). In some instances, wireless-spectrum analysis devices can operate in a variety of locations and environments. As an example, some wireless-spectrum analysis devices can be installed in a vehicle (e.g., a car, a bus, a train, a ship, etc.) where the wireless-spectrum analysis device can monitor and analyze the spectrum while in motion. In other examples, wireless-spectrum analysis devices can be installed on traffic infrastructure, communication infrastructure, power infrastructure, dedicated real property, industrial systems, urban or commercial buildings, residential areas, and other types of locations.

In some implementations, a number of wireless-spectrum analysis devices can be distributed over a geographic region. Each of the wireless-spectrum analysis devices can determine measures related to wireless-spectrum usage at the respective location. Example measures of wireless-spectrum usage can include the amount of power at frequency f over a bandwidth of BW at a given time t, the amount of power per Hz at a frequency f at a given time t, the signal to noise ratio of given signal at frequency f and a given time t, the amount of power over a frequency band of mobile devices used by a particular cellular carrier, the amount of power over a frequency band of a base station used by a particular cellular carrier, or other parameters.

In some implementations, the measures of wireless-spectrum usage can be determined based on analysis of data at one or more of the lowest layers of a communication network. Typically, a communication network can be partitioned into seven logical layers according to the Open Systems Interconnection (OSI) model. The seven logical layers include a physical layer, a data-link layer, a network layer, a transport layer, a session layer, a presentation layer, and an application layer. Among them, the lower layers can include the physical layer and the data-link layer.

Physical layer signals can include raw waveforms, processed waveforms, and analog or digital data that are received, processed, or generated by the physical layer. Typically, the physical layer (the lowest layer, also referred to as "layer 1") provides technical specifications of physical links between directly connected network nodes over a physical transmission medium (e.g., a copper wire, fiber optical cable, wireless-spectrum, etc.). The physical layer includes technologies for converting bit streams into physical signals, and vice versa, and defines interfaces between a network node to the transmission medium for signal transmission and reception.

Data-link layer signals can include raw waveforms, processed waveforms, analog data, and digital data that are received, processed, or generated by the data-link layer. Typically, the data-link layer (the second-lowest layer, also referred to as "layer 2") includes protocols for data transfer (e.g., in frames) across the physical links and includes functionality for error detection and correction. The data-link layer can be divided into two sublayers: a Media Access Control (MAC) layer for controlling how network nodes gain access to the transmission medium and Logical Link Control (LLC) layer for controlling error checking and packet synchronization.

Typically, the higher layers (i.e., the network layer (also referred to "as layer 3") and other layers above the physical and data-link layers) are agnostic with respect to the physical transmission medium, the physical layer, and the data-link layer interface with the physical transmission medium such as the wireless-spectrum. Accordingly, distinctive measures of wireless-spectrum usage can be determined based on analysis of physical layer signals and data-link layer signals. The physical layer signal and data-link layer can be, analyzed using, for example, filtering, A/D or D/C converting, estimation, equalization, and other signal processing techniques. For instance, the measures of wireless-spectrum usage such as, for example, the power level or the SNR at a certain frequency or frequency band can be determined by the DSP spectrum analysis engine 760 based on physical layer and data-link layer processing and analysis of the RF signals passing through the RF interface or radio path A 710 of FIG. 7.

In some implementations, the wireless-spectrum usage information measured by the multiple wireless-spectrum analysis devices can be displayed, for example, as a surface plot, to visually indicate the wireless-spectrum usage over the geographic region. In some instances, a surface plot can include a three-dimensional (or higher-dimensional) plot that shows one coordinate component of a point (e.g., the z-coordinate) as a function of at least two other coordinate components (e.g., the x- and y-coordinates). For example, for a given measure type, a surface plot can be generated to show values of the measure versus the locations where the values of the measure are obtained. The surface plot can show, for example, coverage, distribution, density, trend, or other attributes of the measure that reflect the wireless-spectrum usage over the geographic region. In some implementations, a surface plot can include a two-dimensional contour-style plot that includes one or more contours, where each contour denotes locations in the xy-plane that share a common z value. In some instances, a surface plot can include additional or different representations of a three-dimensional or higher-dimensional surface.

Figure 12:
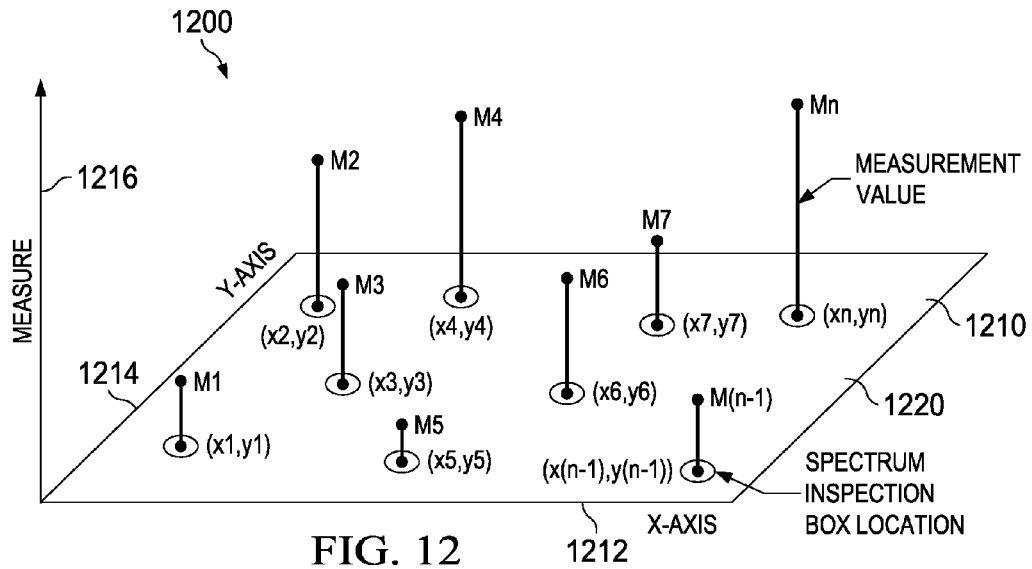
FIG. 12 is a diagram showing an example surface plot of a measure of wireless-spectrum usage for a geographic region.

FIG. 12 is a diagram showing an example surface plot 1200 of a measure of wireless-spectrum usage for a geographic region 1210. The example surface plot 1200 includes a surface 1220 with an x-axis 1212 and a y-axis 1214, representing the geographic region 1210. A number of wireless-spectrum analysis devices are distributed over the geographic region 1210 at respective locations $(x_1, y_1), (x_2, y_2), \ldots (x_n, y_n)$. The example surface plot 1200 also includes a z-axis 1216 representing the measure of the wireless-spectrum usage. As shown in FIG. 12, the values of the measure detected by the wireless-spectrum analysis devices are represented by the heights of bars $M_1, M_2, \ldots, M_n$, respectively. In some implementations, the different values can be represented by different shapes, sizes, colors, color intensities, shadowing, or other displayed attributes or patterns.

Figure 13:
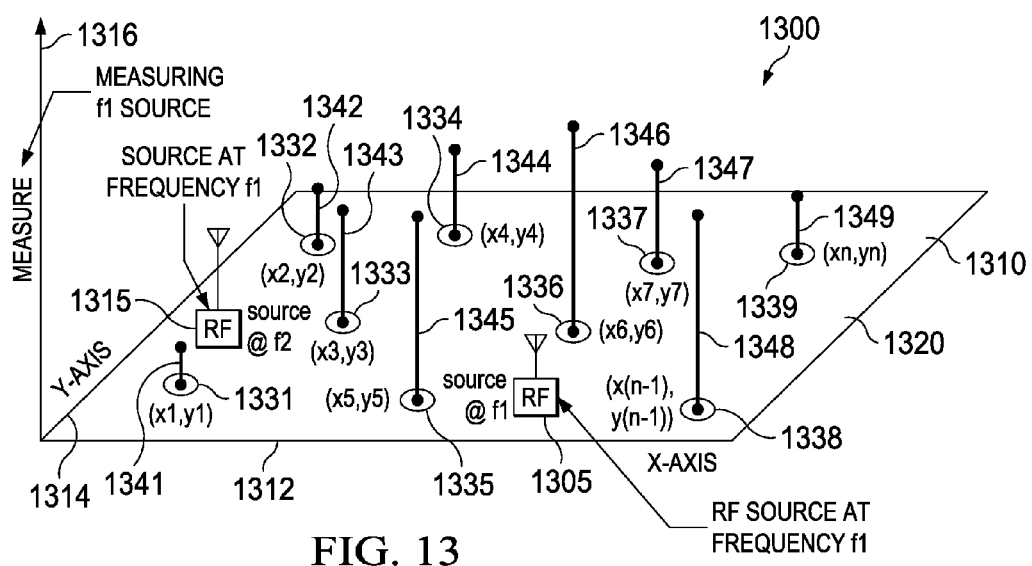
FIG. 13 is a diagram showing another example surface plot of a measure of wireless-spectrum usage for a geographic region.

FIG. 13 is a diagram showing an example surface plot 1300 of a measure of wireless-spectrum usage for a geographic region 1310. The example surface plot 1300 includes a surface 1320 representing the geographic region 1310. The example surface plot 1300 includes a z-axis 1316 representing the measure of wireless-spectrum usage, and an x-axis 1312 and a y-axis 1314 representing locations in the geographic region 1310. The example surface plot 1300 includes an RF source 1305 operating at frequency $f_1$ and an RF source 1315 operating at frequency $f_2$. The example measure of wireless-spectrum usage shown in FIG. 13 can be a signal power at frequency $f_1$ detected by wireless-spectrum analysis devices 1331, 1332, . . . , 1339 at respective locations $(x_1, y_1), (x_2, y_2), \ldots (x_n, y_n)$. The signal power detected by the wireless-spectrum analysis devices 1331, 1332, . . . , 1339 are represented by bars 1341, 1342, . . . , 1349, respectively. As shown in FIG. 13, wireless-spectrum analysis devices (e.g., 1335, 1336, and 1338) near the RF source 1305 detect higher values of the signal power at frequency $f_1$ than the spectrum analysis devices (e.g., 1335, 1336, and 1338) that are located far away from the RF source 1305.

Figure 14:
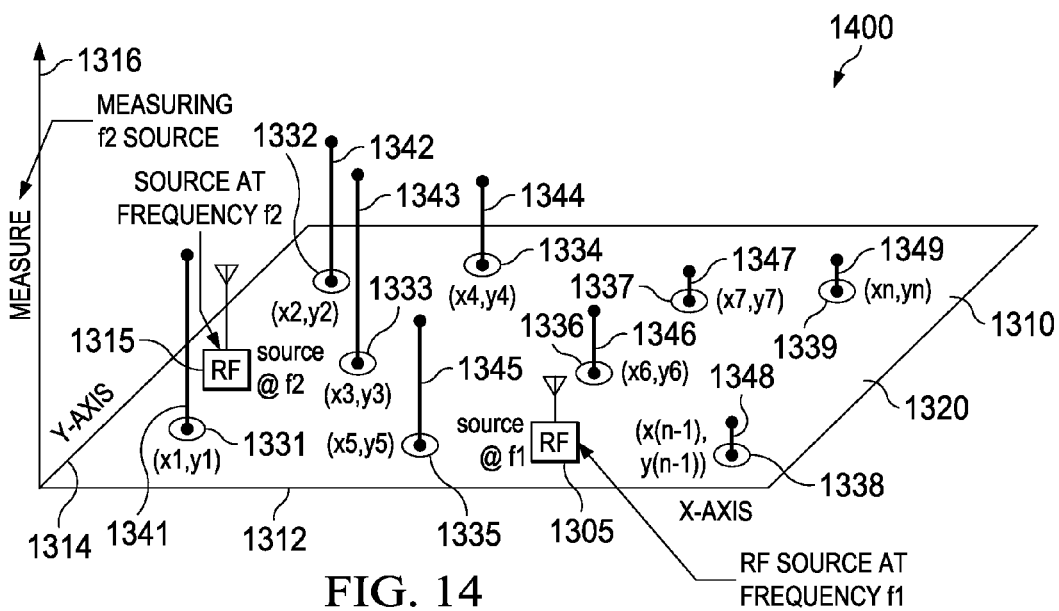
FIG. 14 is a diagram showing an example surface plot of another measure of wireless-spectrum usage for the geographic region 1310 of FIG. 13.

FIG. 14 is a diagram showing an example surface plot 1400 of another measure of wireless-spectrum usage for the geographic region 1310 of FIG. 13. The measure of wireless-spectrum usage shown in FIG. 14 can be, for example, a signal power at frequency $f_2$ detected by the wireless-spectrum analysis devices 1331, 1332, ..., 1339 at respective locations $(x_1, y_1), (x_2, y_2), \ldots (x_n, y_n)$. The example surface plot 1400 shows that wireless-spectrum analysis devices (e.g., 1331, 1332, and 1333) near the RF source 1315 detect higher values of the signal power at frequency $f_2$ than wireless spectrum analysis devices (e.g., 1337, 1338, and 1339) located far away from the RF source 1315.

The surface plots 1300 and 1400 can represent the measures of wireless-spectrum usage for the geographic region 1310 at a particular time t or the changes of the measures over time. In some implementations, the surface plots 1300 and 1400 can be animated to show the measures of wireless-spectrum usage in real time (or substantially real time), for example, to show the change or update of the wireless-spectrum usage information measured by the multiple wireless-spectrum analysis devices. The surface plots 1300 and 1400 can be displayed in real time, for example, by rendering or generating the plots in response to receiving the wireless-spectrum usage information (e.g., from a data aggregation system or one or more wireless-spectrum analysis devices) without substantial delay. In some instances, displaying a surface plot in real time can include, for example, continuously monitoring and receiving the wireless-spectrum usage information, dynamically calculating measures or other attributes of the wireless-spectrum usage based on the monitored wireless-spectrum usage information, dynamically changing or adapting the representation of the surface plots, generating a notification or other types of output within a time frame, for example, to allow a user to respond to the output, or other operations. As such, the surface plots 1300 and 1400 can reflect the latest wireless-spectrum usage for the geographic region 1310. In some implementations, the surface plots 1300 and 1400 can be animated to show historical measures of wireless-spectrum usage, for example, between a starting time and an ending time specified by a user. Additional or different statistics or properties of the measures of wireless-spectrum usage can be displayed.

In some implementations, surface plots 1300 and 1400 can be superimposed onto a view of the geographic region 1310. The surface 1320 can be, for example, a map, topology, or other visual representations of the geographic region 1310. The surface 1320 can be of two, three, or higher dimensions. In some instances, the view of the geographic region 1310 can be, for example, an augmented reality view, a through-lens view, a live-camera view, a naked-eye view, or other types of view of the geographic region 1310.

In some implementations, in addition to or as an alternative to three-dimensional surface plots (e.g., surface plots 1300 and 1400), two-dimensional surface plots (e.g., contour-style, temperature-style, etc.) can be generated and superimposed onto a view of the geographic region. In some implementations, temperature-style surface plots (e.g., heat maps) can be used to show a measure of wireless-spectrum usage for a geographic region. Additional or different types of plots can be used.

In some implementations, the surface plot can be included in a user interface (UI) to be displayed on a display device. The UI can include additional features to provide enhanced user experience for visualizing the wireless-spectrum usage for the geographic region. For example, the UI can allow a user to zoom-in, zoom-out, rotate, filter, or otherwise modify the surface plot. In some implementations, the UI can allow the user to specify the shape, size, color, or other parameters of the surface plot. Additional or different features can be added to the surface plot to display the wireless-spectrum usage for the geographic region.

Figure 15:
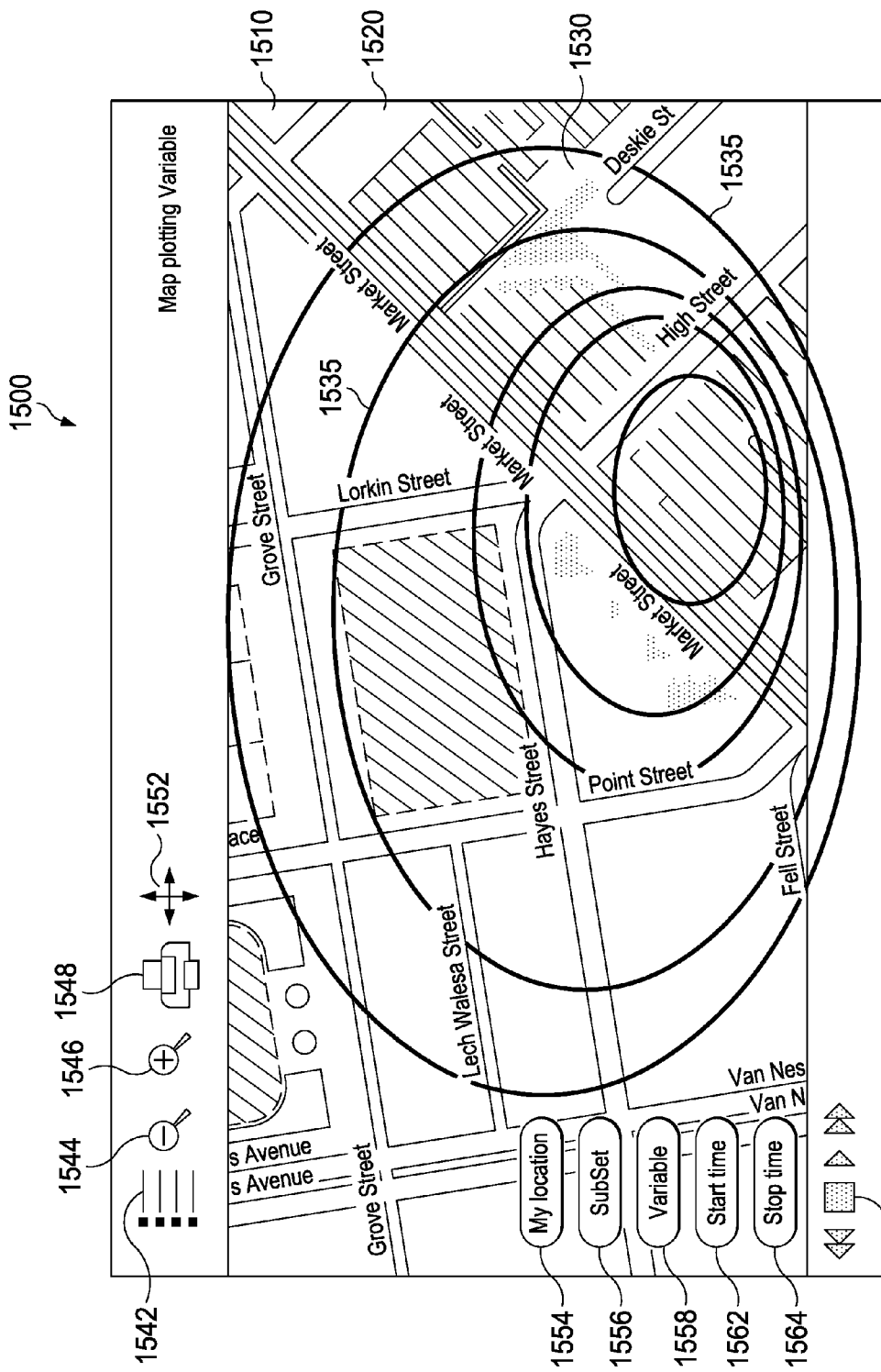
FIG. 15 is a diagram showing an example user interface (UI) showing a surface plot of a measure of wireless-spectrum usage for the geographic region.

FIG. 15 is a diagram showing an example user interface (UI) 1500 showing a measure of wireless-spectrum usage for the geographic region. The example UI 1500 includes a surface plot 1530 superimposed on a view 1520 of a geographic region 1510. The view 1520 of the geographic region 1510 includes a map of the geographic region 1510. The surface plot 1530 includes a contour-style plot with multiple contour lines 1535. Each contour line can represent a value of the measure of wireless-spectrum usage, indicating that the locations in or about the contour line have the same value of the measure of wireless-spectrum usage. In some implementations, the contour-style plot can also be illustrated as a heat map, for example, by using different colors to show different values of the measure.

The UI 1500 includes multiple example icons that provide various display and visualization options. For instance, the UI 1500 includes a detail menu 1542 that can provide detailed information about the measure of wireless-spectrum usage for the geographic region 1510. For example, the detailed information can include the name and values (e.g., in a list, table, or other format) of the displayed measure of wireless-spectrum usage, detailed information (e.g., city, zip code, latitude, longitude, elevation, etc.) of the displayed geographic region 1510, a synopsis of a spectral-usage report of the displayed geographic region 1510, statics (e.g., maximum, minimum, average, variance, etc.) of the values of the displayed measure of wireless-spectrum usage, or other information.

The UI 1500 can include a zoom-out icon 1544, zoom-in icon 1546, and pan/tilt icon 1552 to provide pan-tilt-zoom (PTZ) control of the surface plot 1530 and the corresponding view 1520 of the geographic region 1510. For example, the zoom-out icon 1544 and zoom-in icon 1546 enable zooming out and zooming in the surface plot 1530 and the corresponding view 1520 of the geographic region 1510, respectively. The pan/tilt icon 1552 enables directional control of the view 1520 of the geographic region 1510, for example, by allowing a user to rotate the view 1520 of the geographic region 1510 vertically or horizontally. In some implementations, the surface plot 1530 and the corresponding view 1520 can be updated according to the zoom-out, zoom-in, or pan/tilt operations, for example, by displaying fewer, additional, or different contour lines 1535 over a zoomed-out, zoomed-in, or panned/tilted view of the geographic region 1510.

The UI 1500 can include print or save icons 1548 that enable a user to output the displayed measure of wireless-spectrum usage for the geographic region 1510. Additional or different output methods can be used.

The UI 1500 can include a "My location" icon 1554 that can provide geographic information of a location of interest textually or graphically. The location of interest can include, for example, a current location of the display device, a home or work location of a user, or other locations. In some implementations, upon activating the "My location" icon 1554, the location of interest can be displayed in the view 1520 of the geographic region 1510, in a pop-up text box, or be presented in a combination of these and other techniques.

The UI 1500 can include icons for generating, modifying, updating, or otherwise managing the surface plot 1530 of the measure of wireless-spectrum usage for the geographic region 1510. The example UI 1500 shown in FIG. 15 includes a "Subset" icon 1556, a "Variable" icon 1558, a "Start time" icon 1562, a "Stop time" icon 1564, and time play icons 1566. Additional or different icons can be included. These icons can be activated (e.g., clicked or selected by a mouse or voice control command) to allow a user to select or input parameters for generating, customizing, or otherwise managing the surface plot 1530 of the measure of wireless-spectrum usage for the geographic region 1510. For instance, upon activation of an icon, a list or table of selectable parameters, a text box, or other prompts can be displayed to solicit user input. In some implementations, the surface plot 1530 can be modified or a new surface plot can be generated based on the user input.

Figure 16A:
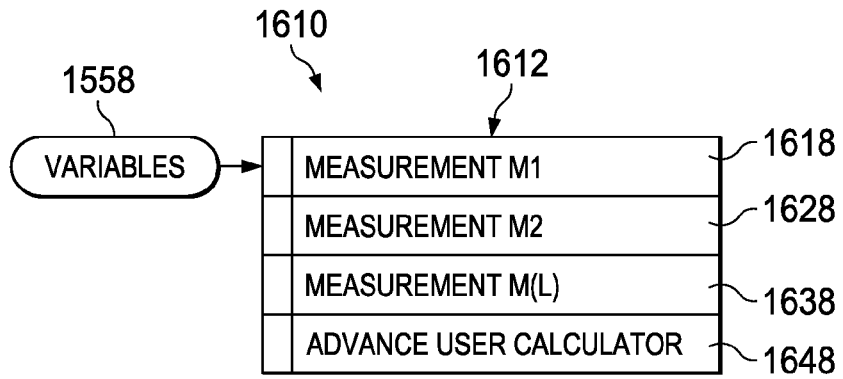
FIG. 16A is a diagram showing an example list of selectable parameters for the example "Variables" icon 1558 of FIG. 15.

FIG. 16A is a diagram 1610 showing an example list 1612 of selectable parameters for the example "Variables" icon 1558 of FIG. 15. The example "Variables" icon 1558 can include variables (e.g., one or more measures of wireless-spectrum usage) to be plotted or otherwise displayed in the surface plot 1530. The variables can be the underlying variables represented by the z-axis 1316 of the example surface plot 1300, by the contour lines 1535 of the example surface plot 1530, or other variables that can be displayed in a surface plot. The list 1612 of the "Variables" icon 1558 can include, for example, different types of measures, different values of one or more types of measures, or other variables. In some implementations, a type of measure can be selected and the surface plot 1530 can be updated to display the values of the selected measure of wireless-spectrum usage for the geographic region 1510. In some implementations, one or more types of measures can be selected and input into a calculator 1648 for calculating a measure to be displayed by the surface plot 1530. The calculator 1648 can perform, for example, filtering, normalization, correlation, regulation, or other statistical analysis and manipulations on the values of the selected measures.

Figure 16B:
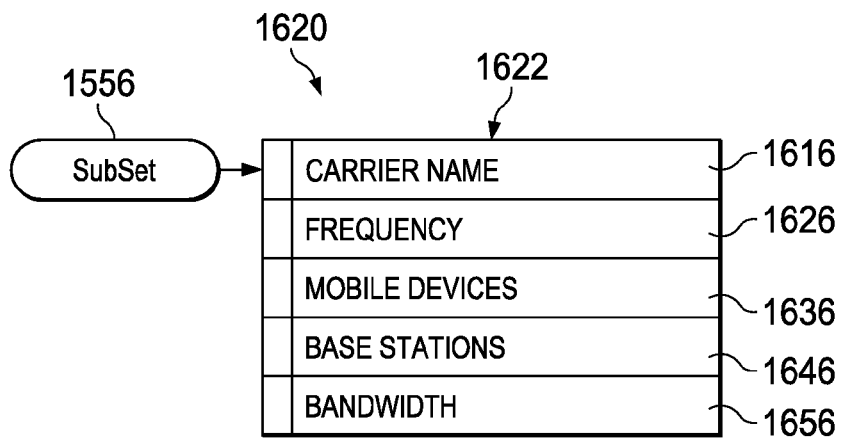
FIG. 16B is a diagram 1620 showing an example list of selectable parameters for the example "Subset" icon 1556 of FIG. 15.

FIG. 16B is a diagram 1620 showing an example list 1622 of selectable parameters for the example "Subset" icon 1556 of FIG. 15. The "Subset" icon 1556 can provide one or more attributes or filters to refine or otherwise modify information displayed in the surface plot 1530. For example, the list 1622 can include a carrier name 1616 (e.g., AT&T, Verizon, Sprint, etc.), one or more particular frequencies 1626 (e.g., 1.9 GHz), a bandwidth 1656 (e.g. 3.84 MHz), RF sources (e.g., "Mobile Devices" 1636 can indicate RF signals coming from mobile devices only, "Base Station" 1646 can indicate RF signals coming from base stations only, etc.), or other attributes. In some implementations, once one or more filters are selected, only a subset of the values of the measures that satisfy the filter criteria can be displayed. As such, a user can classify, compare, contrast, or otherwise drill down the measured wireless-spectrum usage information and perform a targeted analysis of the wireless-spectrum usage for the geographic region 1510.

Figure 16C:
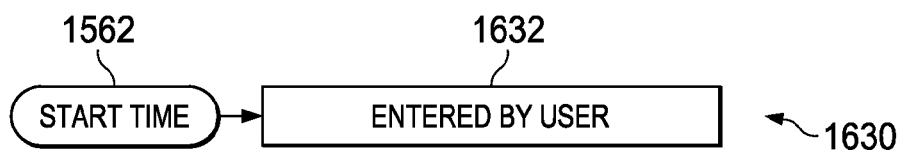
FIGS. 16C and 16D are diagrams showing example text boxes associated with the example "Start time" icon 1562 and "Stop time" icon 1564 of FIG. 15, respectively.
Figure 16D:
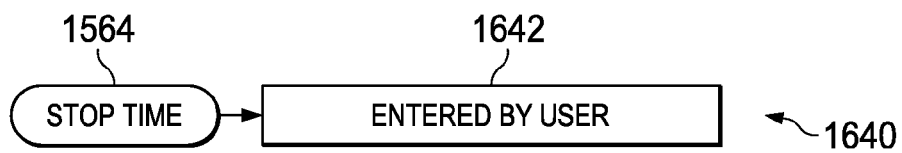

FIGS. 16C and 16D are diagrams 1630 and 1640 showing example text boxes 1632 and 1642 associated with the example "Start time" icon 1562 and "Stop time" icon 1564 of FIG. 15, respectively. In some implementations, the text boxes 1632 and 1642 can include a default start time and a default stop time, respectively. In some implementations, a user can enter a particular start time and the stop time using the text boxes 1632 and 1642, respectively. The UI 1500 can then display a surface plot 1530 showing a time-series of values for the measure of wireless-spectrum usage detected during the period of time specified by the start time and the stop time. The time-series can be presented, for example, as a sequence of images on a display device (e.g., a video). The surface plot 1530 can be animated to show varying contour lines 1535 based on the underlying temporal evolution of the values of the measure. In some implementations, the time play icons 1566 can play, pause, stop, fast forward, fast reverse, slow forward, slow reverse, or otherwise play the surface plot 1530 that is superimposed onto the view 1520 of the geographic region 1510.

In some implementations, the example UI 1500 of FIG. 15 can be presented as a web page, a standalone program window, an application, or another form by a display device (e.g., a screen, a touch screen, a monitor, etc.) of a computing device. The computing device can include a hand-held device (e.g., a smartphone, a tablet, a phablet, etc.), a personal computer, a wearable device (e.g., a smart watch, a head-mounted device, etc.), or other types of devices. The UI 1500 can be navigated by a keyboard, a mouse, a touch screen, a stylus pen, or other input/output devices. In some implementations, the UI 1500 can be controlled by voice, gesture, eyeball movement, or other user interactions.

Figure 17:
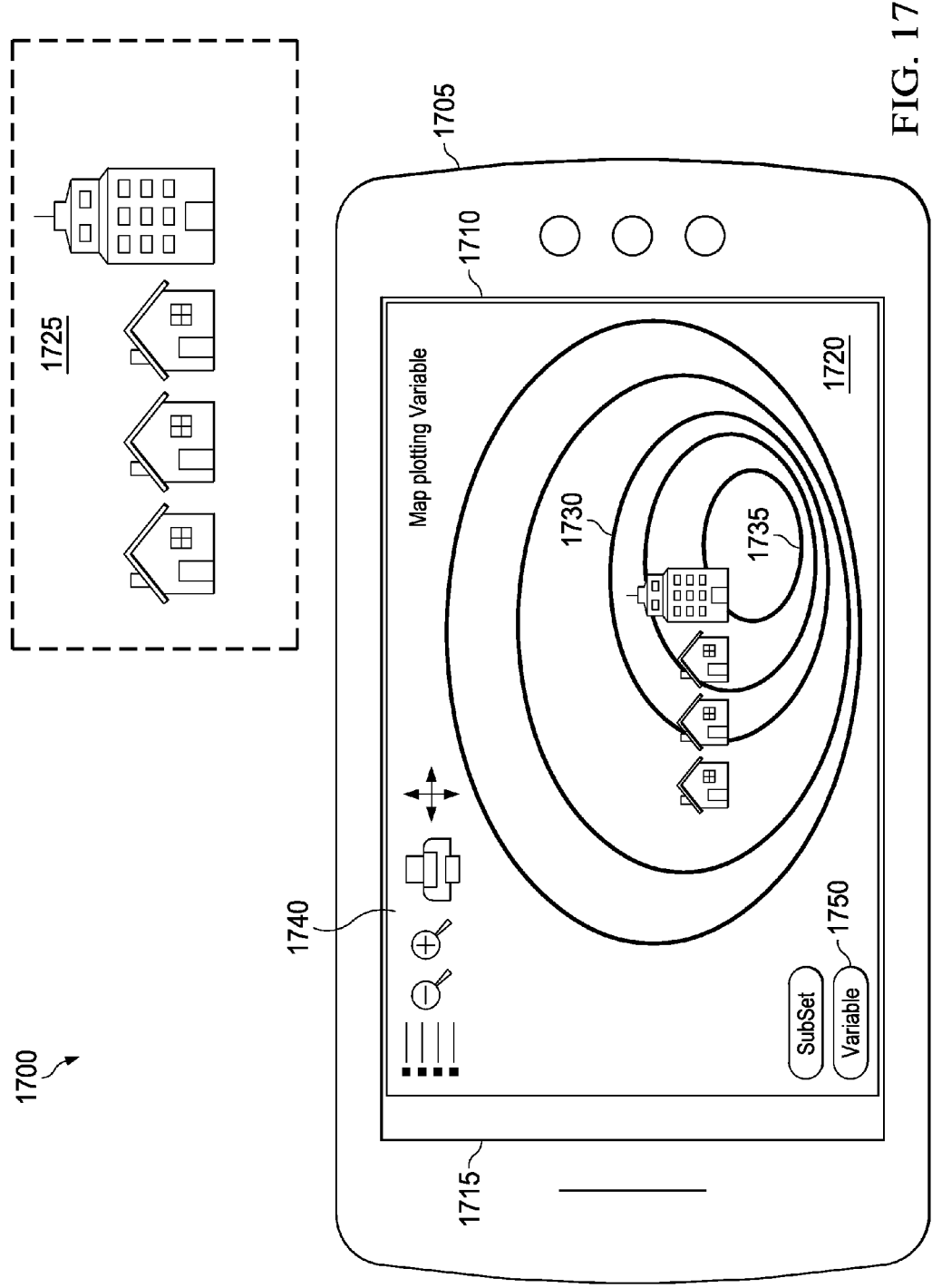
FIG. 17 is a diagram showing an example hand-held device configured to display wireless-spectrum usage information for a geographic region.

FIG. 17 is a diagram 1700 showing an example hand-held device 1705 configured to display wireless-spectrum usage information for a geographic region. The example hand-held device 1705 can be a smart phone, a tablet, or another portable computing device. The example hand-held device 1705 includes a display device 1715 (e.g., a touch screen) and a camera (not shown). In some implementations, the camera of the hand-held device 1705 can provide a live-camera view 1720 of a geographic region 1725. The live-camera view 1720 can include, for example, a real-time or time-delayed image of the geographic region 1725.

In some implementations, the display device 1715 of the hand-held device 1705 can present a UI 1710 that visually indicates wireless-spectrum usage for the geographic region 1725. The UI 1710 can be similar to or different from the example UI 1500 of FIG. 15. For example, the UI 1710 can include a surface plot 1730 of a measure of wireless-spectrum usage for the geographic region 1725. The UI 1710 can include various user-friendly control icons 1740 and 1750 for generating and modifying the surface plot 1730. The surface plot 1730 can include, for example, multiple contour lines 1735 representing locations that share the same values of the measure. FIG. 17 shows the surface plot 1730 superimposed onto the live-camera view 1720 of the geographic region 1725. In some implementations, the hand-held device 1705 determines a position and orientation of the device 1705 based on GPS and gyroscope technologies. The hand-held device 1705 can then retrieve map information about the location and can superimpose the surface plot 1730 onto a map or other view of the geographic region 1725.

Figure 18:
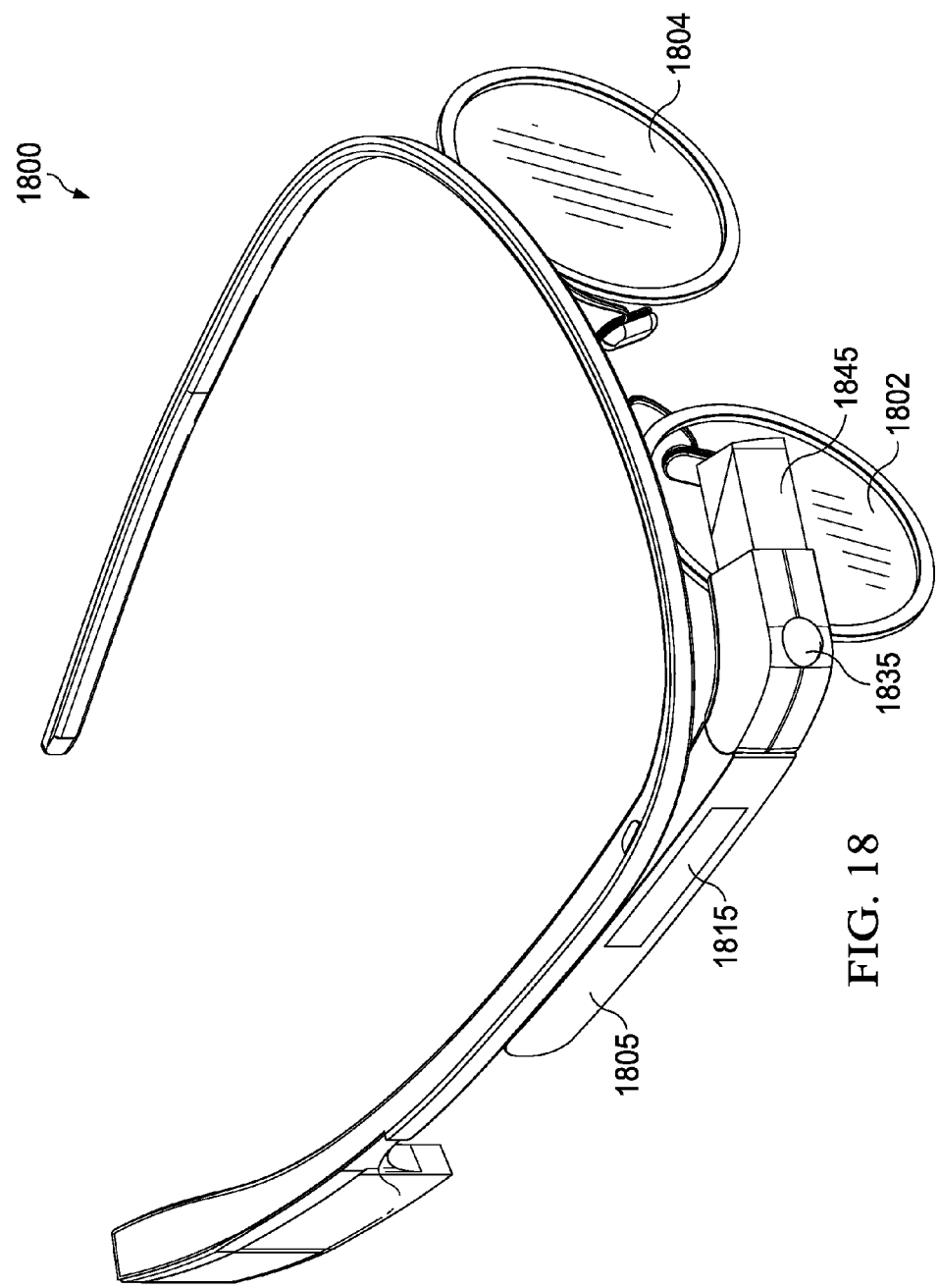
FIG. 18 is a diagram showing an example head-mounted device configured to display wireless-spectrum usage information for a geographic region.

FIG. 18 is a diagram showing an example head-mounted device 1800 configured to display wireless-spectrum usage information for a geographic region. The example head-mounted device 1800 can include smart glasses (e.g., Google Glass), a virtual-reality system (e.g., Oculus Rift), a personal imaging device, or other types of head-mounted computing devices. As shown in FIG. 18, the example head-mounted device 1800 includes an on-board computing system 1805, a touch pad 1815, a camera 1835, and a display 1845. Although FIG. 18 shows the example head-mounted device 1800 includes two lenses 1802 and 1804, in other implementations, the head-mounted device includes none or a single lens. The example head-mounted device 1800 can include additional or different components. In some implementations, a head-mounted device can be configured as shown in FIG. 18 or in another suitable manner.

In some instances, the display 1845 can include an optical head-mounted display (OHMD). The display 1845 can be configured to display wireless-spectrum usage information for a geographic region. For instance, the display 1845 can render a UI that includes a surface plot of a measure of wireless-spectrum usage for the geographic region. The UI can be the example UI 1500 or 1710, or other UIs. In some implementations, the display 1845 can be configured to overlay the surface plot onto a view of the geographic region to form an augmented reality view. In some cases, an augmented reality view can include a view of a real-world environment augmented or supplemented by computer-generated information (e.g., computer-generated images), for example, to enhance a viewer's perception of the reality and improve user interactions. In some cases, an augmented reality view can include a view of a virtual reality environment, where the entire view comprises computer-generated information (e.g., computer-generated images).

In some implementations, a user wearing a head-mounted device (e.g., a head-mounted device with an opaque screen) can have a virtual-reality view of a geographic region, and the display 1845 can superimpose a surface plot onto the virtual-reality view of the geographic region. For instance, the camera 1835 of the head-mounted device 1800 can form a live-image view of the geographic region, and the display 1845 can superimpose the surface plot onto the live-image view provided by the camera 1835. In some implementations, a user wearing the example head-mounted device 1800 can have a through-lens view of the geographic region, for example, by looking through the lens 1802 of the head-mounted device 1800, and the display 1845 can superimpose the surface plot onto the through-lens view of the geographic region. In some implementations, a user wearing a head-mounted device (e.g., a head-mounted device without lens) can have a naked-eye view of a geographic region, and the display 1845 can superimpose a surface plot onto the naked-eye view of the geographic region.

The surface plot of the measure of wireless-spectrum usage for the geographic region can be generated, for example, by the on-board computing system 1805. The on-board computing system 1805 can include, for example, one or more processors, memory, a GPS system, or other components. In some implementations, the on-board computing system 1805 can determine a location of the user wearing the head-mounted device 1800, for example, by the GPS system, the image captured by the camera 1835, or other location determination techniques (e.g., triangulation based on cellular signals). In some implementations, the on-board computing system 1805 can serve as a data aggregation system that receives and aggregates spectral-usage data identified by the wireless-spectrum analysis devices located in or near the geographic region. In some implementations, the on-board computing system 1805 can receive aggregated spectral-usage data transmitted from a data aggregation system. Based on the aggregated spectral-usage data, the on-board computing system 1805 can generate the surface plot of a measure of wireless-spectrum usage for the geographic region.

The touch pad 1815 of the head-mounted device 1800 can be used by the user to create, modify, update, or otherwise control the display of the wireless-spectrum usage information for the geographic region.

Some embodiments of subject matter and operations described in this specification can be implemented in digital electronic circuitry, or in computer software, firmware, or hardware, including the structures disclosed in this specification and their structural equivalents, or in combinations of one or more of them. Some embodiments of subject matter described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of examples have been described. Nevertheless, it will be understood that various modifications can be made. Accordingly, other embodiments are within the scope of the following claims.

The invention claimed is:

1. A method of displaying wireless-spectrum usage information, the method comprising:
   monitoring wireless-spectrum usage concurrently at wireless-spectrum monitoring locations distributed over a geographic region by operation of wireless-spectrum analysis devices distributed over the geographic region;
   transmitting, from each wireless-spectrum analysis device, spectral-usage data identified by the wireless-spectrum analysis device analyzing physical layer signals detected at its wireless-spectrum monitoring location;
   aggregating the spectral-usage data transmitted from the wireless-spectrum analysis devices;
   generating, by operation of data processing apparatus, a surface plot of a measure of wireless-spectrum usage for the geographic region based on the aggregated spectral usage data; and
   superimposing, by operation of a display device, the surface plot onto a view of the geographic region, the superimposed surface plot visually indicating values for the measure of wireless-spectrum usage over the geographic region.

2. The method of claim 1, further comprising animating the superimposed surface plot to visually indicate a time-series of values for the measure of wireless-spectrum usage over the geographic region.

3. The method of claim 1, wherein the measure of wireless-spectrum usage comprises at least one of:
   a power of detected signals in a bandwidth;
   a power of detected signals at one or more frequencies; or
   a signal-to-noise ratio of detected signals at one or more frequencies.

4. The method of claim 1, wherein a head-mounted device comprises the display device, and the surface plot is superimposed on the view of the geographic region to form an augmented reality view.

5. The method of claim 4, wherein the surface plot is superimposed on a naked-eye view of the geographic region.

6. The method of claim 4, wherein the surface plot is superimposed on a through-lens view of the geographic region, and the through-lens view is provided by a lens of the head-mounted device.

7. The method of claim 4, wherein the surface plot is superimposed on a live-camera view of the geographic region, and the live-camera view is provided by a camera of the head-mounted device.

8. The method of claim 1, wherein a hand-held device comprises the display device, and the surface plot is superimposed on the view of the geographic region to form an augmented reality view.

9. The method of claim 1, wherein the view comprises a map of the geographic region.

10. The method of claim 1, wherein the surface plot comprises at least one of a contour-style plot or a temperature-style plot.

11. The method of claim 1, wherein the surface plot is based on analysis of data associated with one or more of the lowest layers of a communication network.

12. The method of claim 1, wherein the surface plot is based on analysis of physical layer signals and data-link layer signals detected at wireless-spectrum monitoring locations distributed over the geographic region.

13. The method of claim 1, further comprising displaying, by operation of the display device, the surface plot in real time.

14. A wireless-spectrum analysis system comprising:
   wireless-spectrum analysis devices at wireless-spectrum monitoring locations distributed over a geographic region, the wireless-spectrum analysis devices configured to:
      monitor wireless-spectrum usage concurrently at the wireless-spectrum monitoring locations; and
      transmit, from the wireless-spectrum analysis device, spectral-usage data identified by the wireless-spectrum analysis device analyzing physical layer signals detected at its wireless-spectrum monitoring location;
   a data aggregation system configured to aggregate the spectral-usage data from the wireless-spectrum analysis devices;
   data processing apparatus configured to generate a surface plot of a measure of wireless-spectrum usage based on the aggregated spectral-usage data; and
   a display device configured to superimpose the surface plot onto a view of the geographic region, the superimposed surface plot visually indicating values for the measure of wireless-spectrum usage over the view of the geographic region.

15. The wireless-spectrum analysis system of claim 14, wherein the display device further configured to animate the superimposed surface plot to visually indicate a time-series of values for the measure of wireless-spectrum usage over the view of the geographic region.

16. The wireless-spectrum analysis system of claim 14, wherein the measure of wireless-spectrum usage comprises at least one of:
   a power of detected signals in a bandwidth;
   a power of detected signals at one or more frequencies; or
   a signal-to-noise ratio of detected signals at one or more frequencies.

17. The wireless-spectrum analysis system of claim 14, wherein the view comprises a map of the geographic region.

18. The wireless-spectrum analysis system of claim 14, wherein the surface plot comprises at least one of a contour-style plot or a temperature-style plot.

19. The wireless-spectrum analysis system of claim 14, wherein the surface plot is based on analysis of data at one or more of the lowest layers of a communication network.

20. The wireless-spectrum analysis system of claim 14, wherein the surface plot is based on analysis of physical layer signals and data-link layer signals detected at wireless-spectrum monitoring locations distributed over the geographic region.

* * * * *